(12) United States Patent
Baltes

(10) Patent No.: US 8,640,377 B2
(45) Date of Patent: Feb. 4, 2014

(54) FISHING ROD AND BEVERAGE HOLDER

(75) Inventor: Michael Baltes, Hobe Sound, FL (US)

(73) Assignee: MTB Designs, Inc., Hobe Sound, FL (US)

( * ) Notice: Subject to any disclaimer, the term of this patent is extended or adjusted under 35 U.S.C. 154(b) by 444 days.

(21) Appl. No.: 12/612,852

(22) Filed: Nov. 5, 2009

(65) Prior Publication Data
US 2011/0099883 A1 May 5, 2011

(51) Int. Cl.
A01K 97/10 (2006.01)
(52) U.S. Cl.
USPC ............ 43/21.2; 114/364; 224/922; 224/926; 224/406; 248/511; 248/523; 248/311.2
(58) Field of Classification Search
USPC .................. 43/21.2; 224/922, 926, 406, 567; 248/523, 511, 311.2; 114/364, 255
See application file for complete search history.

(56) References Cited

U.S. PATENT DOCUMENTS

| | | | | |
|---|---|---|---|---|
| 2,946,546 A * | 7/1960 | Pokorny et al. | ............... | 248/534 |
| 2,981,509 A * | 4/1961 | Messenger et al. | ........... | 248/538 |
| 3,964,706 A * | 6/1976 | Adams | ............................ | 43/21.2 |
| 4,062,299 A * | 12/1977 | Smith | ............................ | 114/364 |
| D261,581 S * | 11/1981 | Buchanan | ..................... | D22/147 |
| 4,375,731 A * | 3/1983 | Budd | ............................. | 43/21.2 |
| 4,425,729 A * | 1/1984 | Miyamae | ........................ | 43/21.2 |
| 4,485,579 A * | 12/1984 | Hawie | ............................. | 43/21.2 |
| 4,578,891 A * | 4/1986 | Murray | ............................ | 43/21.2 |
| 4,596,370 A * | 6/1986 | Adkins | ........................ | 248/311.2 |
| 4,681,219 A * | 7/1987 | Kitchens | ....................... | 224/920 |
| 4,682,438 A * | 7/1987 | Arrow | .............................. | 43/21.2 |
| 4,749,162 A * | 6/1988 | Wanzor | .......................... | 114/364 |
| 4,778,141 A * | 10/1988 | Bogar | ............................ | 43/21.2 |
| 4,836,127 A * | 6/1989 | Wille | ............................... | 43/21.2 |
| 4,856,220 A * | 8/1989 | Oak et al. | ........................ | 43/21.2 |
| 4,876,980 A * | 10/1989 | Bell, III | ........................... | 43/21.2 |
| 4,887,375 A * | 12/1989 | Shedd et al. | .................... | 43/21.2 |
| 4,919,316 A * | 4/1990 | Grauberger | ..................... | 43/21.2 |
| 5,052,649 A * | 10/1991 | Hunnicutt | .................. | 248/311.2 |
| 5,054,738 A * | 10/1991 | Harding | .......................... | 43/21.2 |
| 5,065,540 A * | 11/1991 | Potter, Jr. | ......................... | 43/21.2 |
| 5,070,638 A * | 12/1991 | Tregaskis | ........................ | 43/21.2 |
| 5,088,673 A * | 2/1992 | Chandler | .................... | 248/311.2 |
| 5,102,085 A * | 4/1992 | Wieczorek et al. | ............ | 224/926 |
| 5,163,244 A * | 11/1992 | Rupp | ............................... | 43/21.2 |
| 5,301,451 A * | 4/1994 | VanAssche | ..................... | 43/21.2 |
| 5,676,340 A * | 10/1997 | Ruhnau | .......................... | 224/926 |
| 5,897,041 A * | 4/1999 | Ney et al. | ....................... | 224/926 |
| 5,987,803 A * | 11/1999 | White | ............................. | 43/21.2 |
| 6,626,409 B1 * | 9/2003 | Thompson | ...................... | 43/21.2 |

(Continued)

Primary Examiner — Darren W Ark
(74) Attorney, Agent, or Firm — McHale & Slavin, P.A.

(57) ABSTRACT

A combined fishing rod and beverage holder for insertion into and removal from an opening in a marine vessel is disclosed. The combined fishing rod and beverage holder includes a substantially tubular hollow cylindrical member which is formed with an upper portion and a lower portion. The upper portion has a diameter which is larger than the diameter of the lower portion. The diameter of the upper portion enables a beverage container with or without an insulating jacket to be placed within and retained within the upper portion of the combined rod and beverage holder. The upper portion includes an outwardly projecting flange which includes apertures through which fasteners can be placed to secure the combined rod and beverage holder to a surface, such as a gunwale of a marine vessel. Other types or secure devices can also be employed to secure the combined rod and beverage holder to any surface.

14 Claims, 30 Drawing Sheets

(56) References Cited

U.S. PATENT DOCUMENTS

| | | | |
|---|---|---|---|
| 6,935,267 B1* | 8/2005 | Cotton | 114/364 |
| 6,993,865 B2* | 2/2006 | Peters et al. | 43/21.2 |
| 7,004,102 B2* | 2/2006 | Sampson et al. | 114/364 |
| 7,147,192 B2* | 12/2006 | Kong | 224/926 |
| 7,200,967 B1* | 4/2007 | Seaman et al. | 43/21.2 |
| 7,328,876 B2* | 2/2008 | Jones | 224/926 |
| 7,343,870 B1* | 3/2008 | Scholz et al. | 114/364 |
| 7,401,574 B1* | 7/2008 | Sampson et al. | 119/51.01 |
| 7,708,247 B2* | 5/2010 | Lota | 224/926 |
| 7,748,678 B2* | 7/2010 | Camarota et al. | 248/311.2 |
| 2004/0025404 A1* | 2/2004 | Thompson | 43/21.2 |
| 2005/0102881 A1* | 5/2005 | Legendziewicz | 43/21.2 |
| 2006/0060149 A1* | 3/2006 | Skowronski | 119/61.55 |
| 2006/0064920 A1* | 3/2006 | Wilcox et al. | 43/21.2 |
| 2006/0086877 A1* | 4/2006 | Cotton | 248/311.2 |
| 2006/0261234 A1* | 11/2006 | Taboada | 248/314 |
| 2006/0277813 A1* | 12/2006 | Saldana | 43/21.2 |
| 2008/0011925 A1* | 1/2008 | Ruff et al. | 248/310 |
| 2008/0087211 A1* | 4/2008 | Sutherland et al. | 114/364 |
| 2008/0111038 A1* | 5/2008 | Carnevali | 248/276.1 |
| 2008/0236021 A1* | 10/2008 | McNamire | 43/21.2 |
| 2008/0295383 A1* | 12/2008 | Wakefield et al. | 43/21.2 |
| 2010/0096521 A1* | 4/2010 | White et al. | 248/311.2 |

* cited by examiner

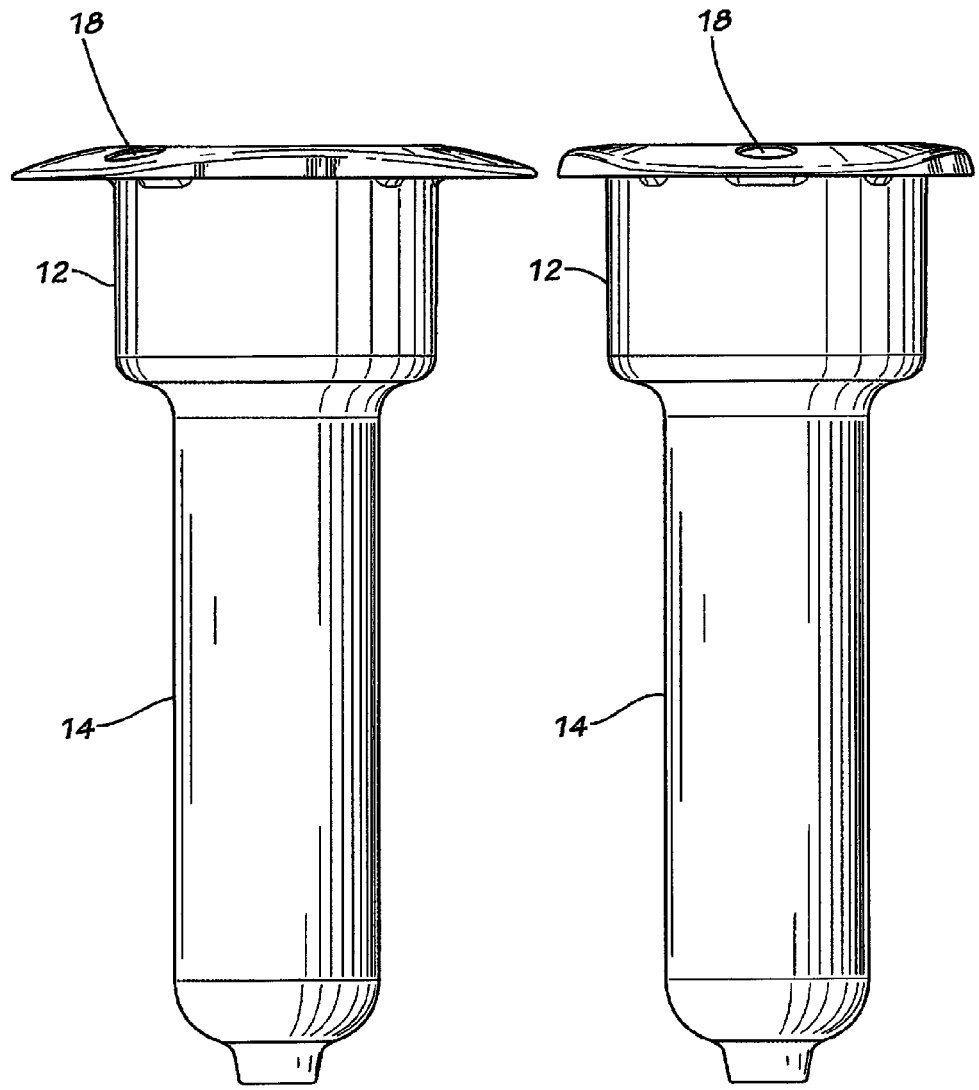
FIG. 3   FIG. 4

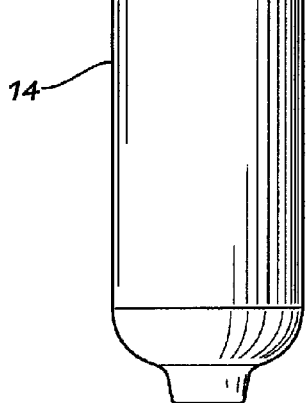
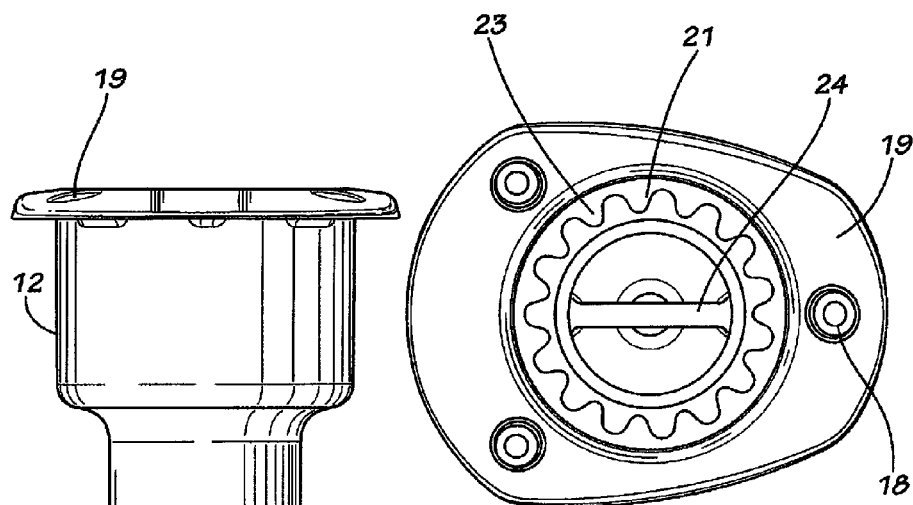
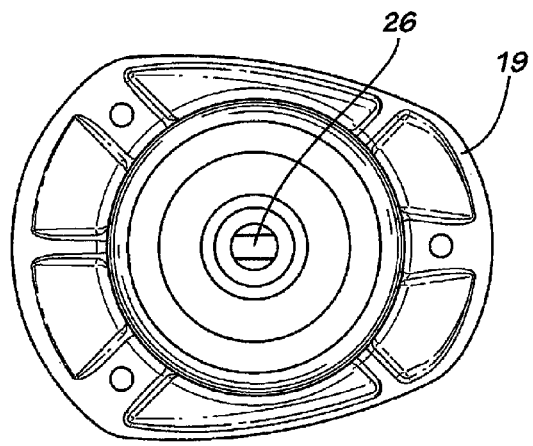
FIG. 5
FIG. 6
FIG. 7

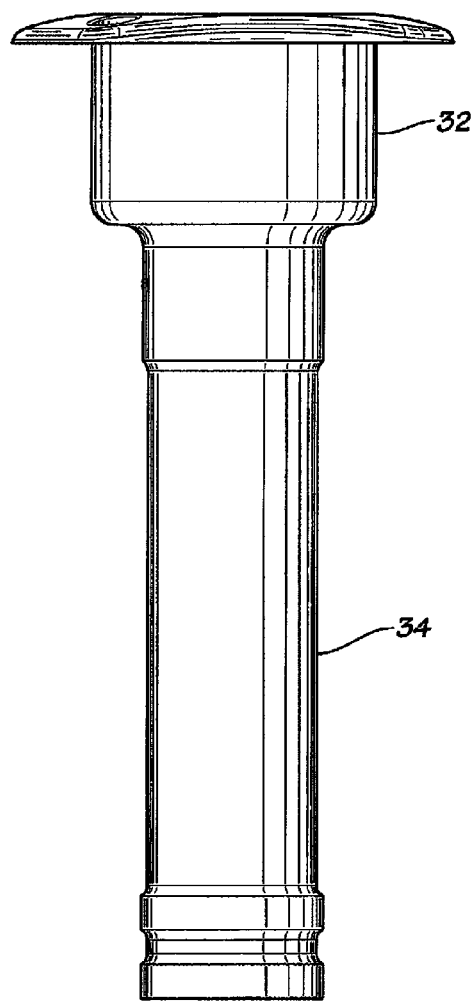 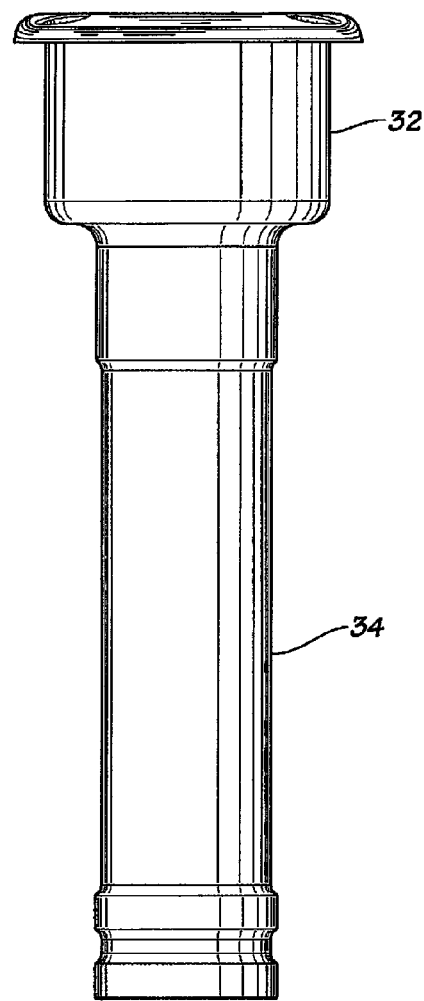
FIG. 10　　FIG. 11

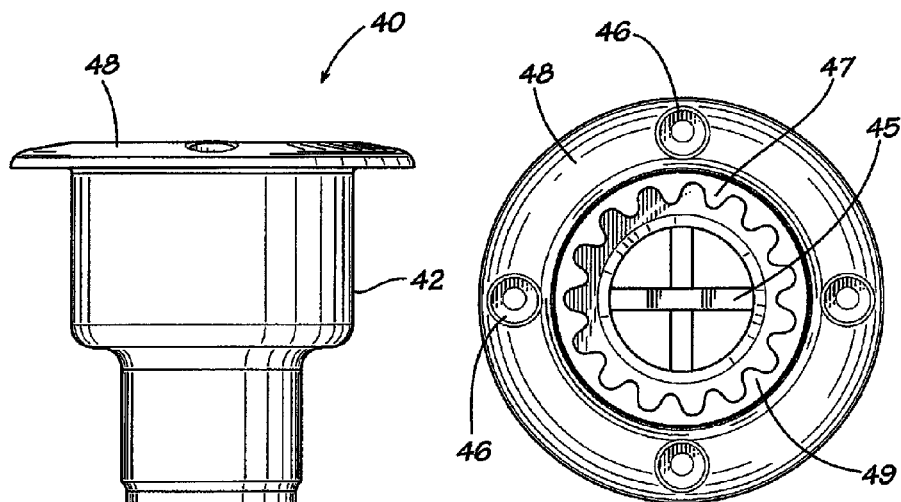
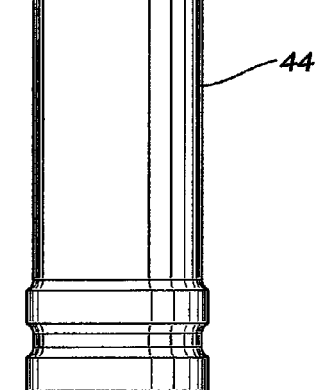
FIG. 15
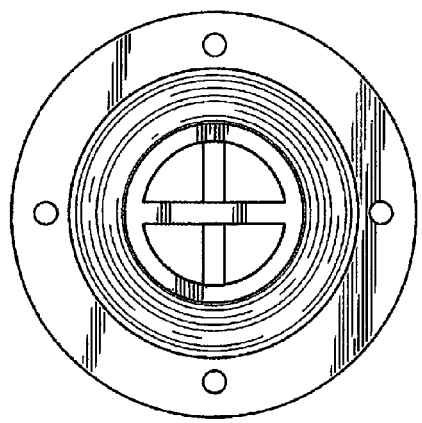
FIG. 17

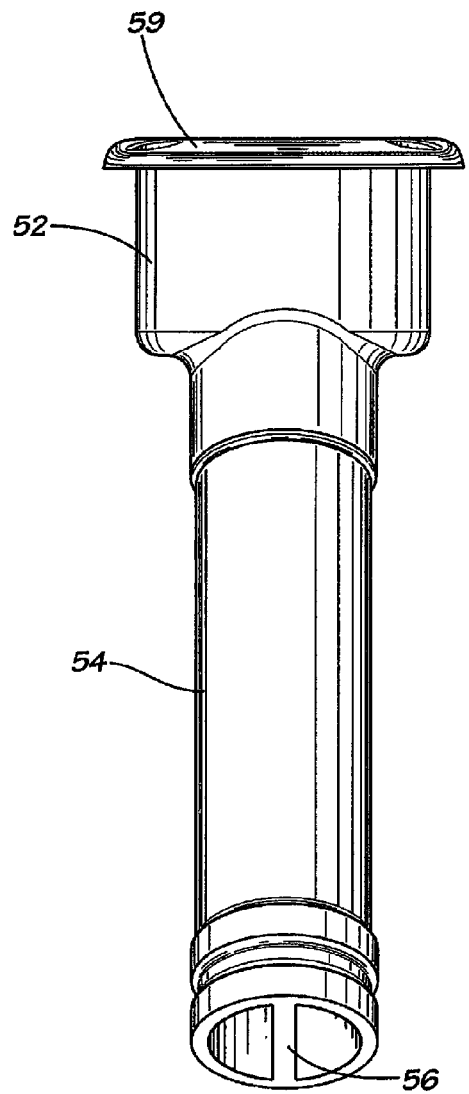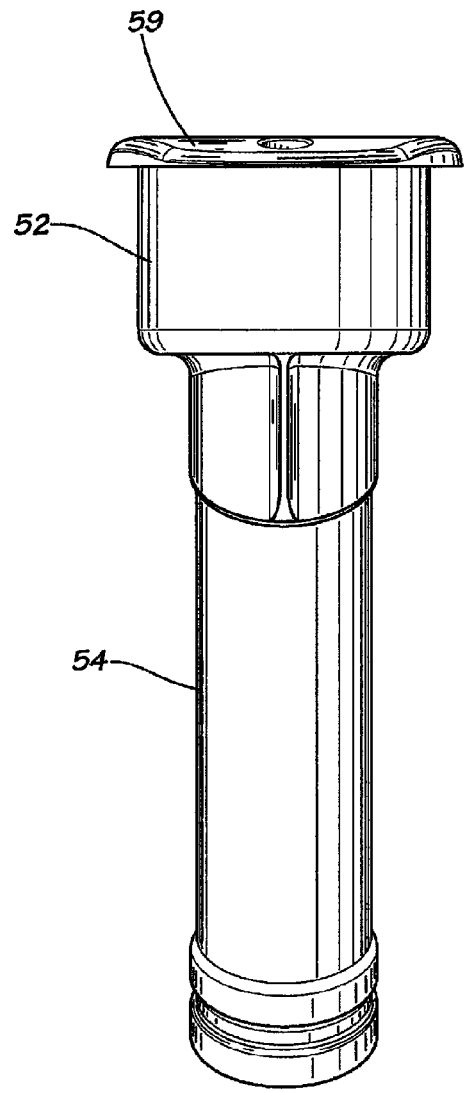
FIG. 21     FIG. 22

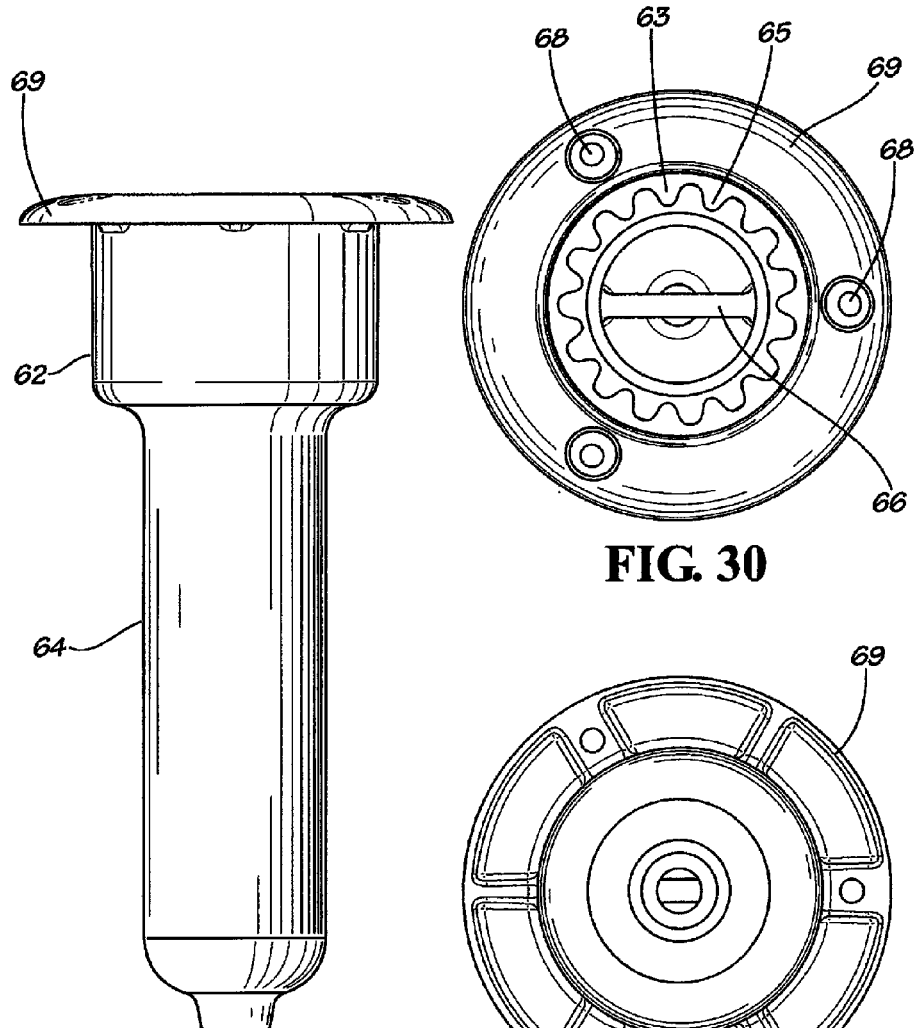

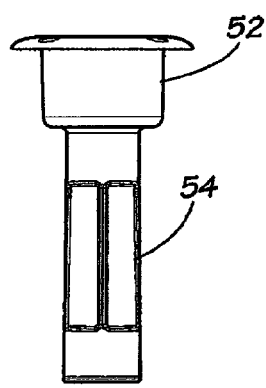
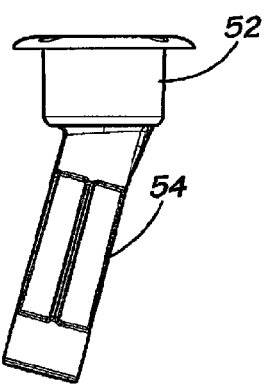
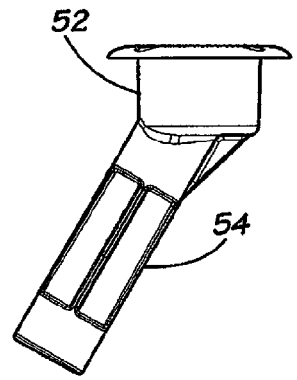
FIG. 34A    FIG. 34B    FIG. 34C
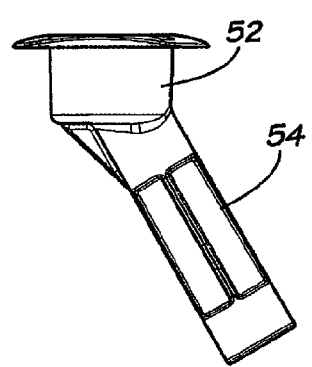
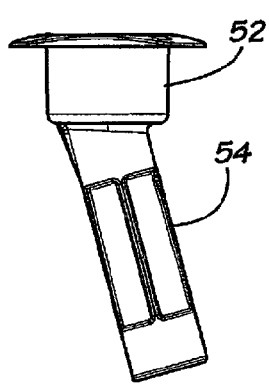
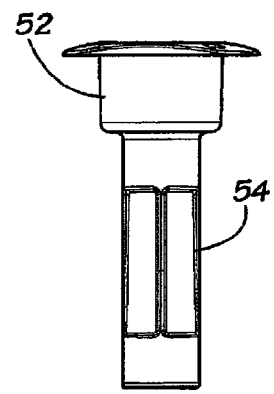
FIG. 35A    FIG. 35B    FIG. 35C

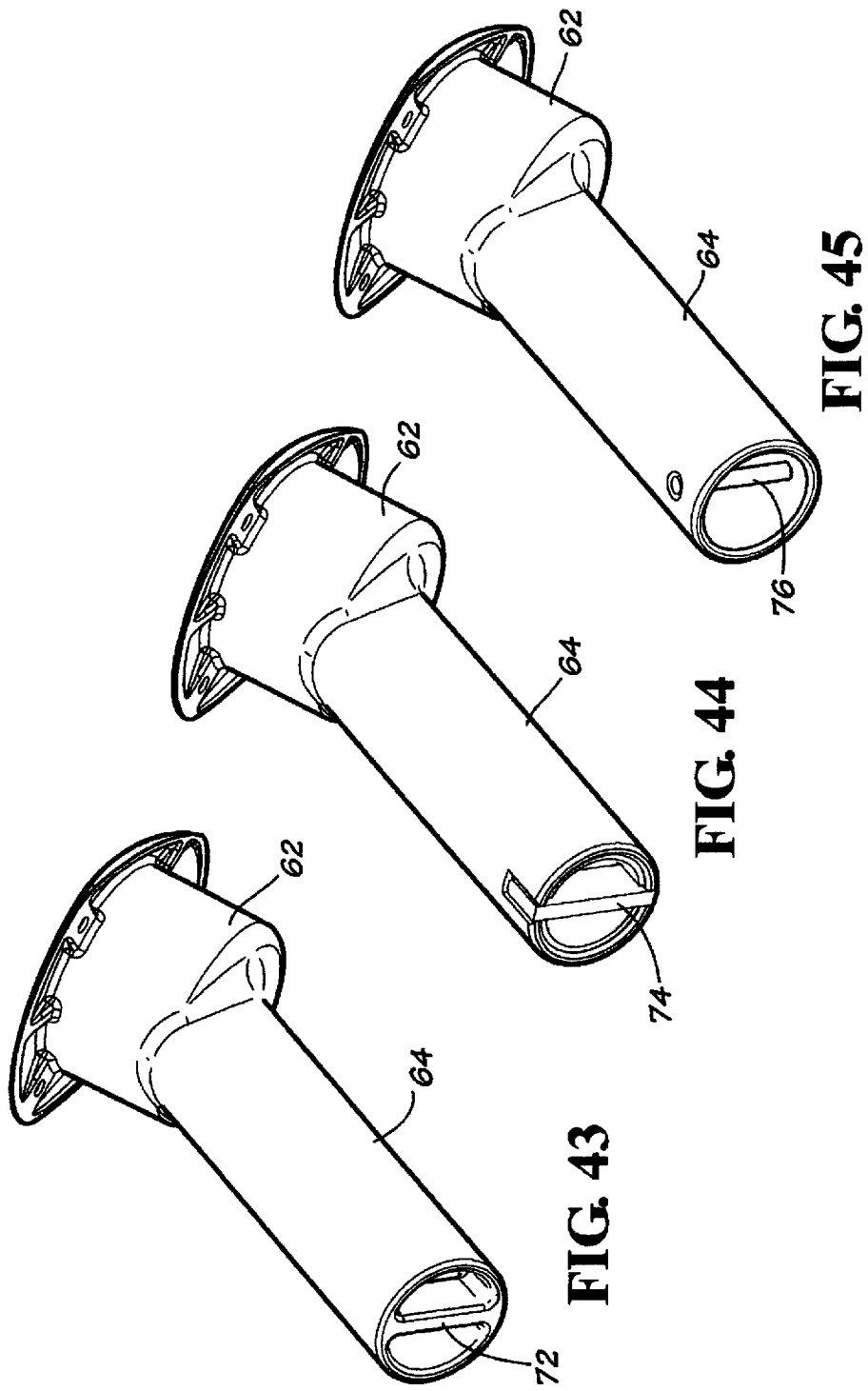

FISHING ROD AND BEVERAGE HOLDER

FIELD OF THE INVENTION

The instant invention relates to holders for both fishing rods and beverage containers. In particular the invention relates to a fishing rod holder which is used in conjunction with marine craft, i.e. boats, and can also function to hold and retain a beverage container, i.e. a soda can or bottle.

BACKGROUND OF THE INVENTION

Marine craft, such as boats, are available in many styles and include many different features for the convenience and comfort of the operator and passengers. Many marine craft include beverage holders for the convenience of the passengers. Other marine craft, such as fishing boats, include fishing rod holders mounted into the structure of the boat. These fishing rod holders are usually mounted into the gunwale along the sides of the boat and also along the stern. The diameter of the fishing rod holders is normally slightly larger than the largest diameter fishing rod which could be used on that particular boat. Fishing rod holders are available in only a few different sizes. This is mainly because the fishing rod holder must be designed to hold and retain the fishing rod during all types of conditions that would be encountered during a fishing expedition. If the fishing rod holder were too large in diameter, the fishing rod could be readily removed from the rod holder when the boat encountered large waves or when an extremely large fish became hooked up.

The fishing rod holder diameters cannot be too small either. The small diameter would prevent the ease of removal of the fishing rod from the holder once a fish has taken the bait and became hooked up.

DESCRIPTION OF THE PRIOR ART

U.S. Pat. No. 4,919,316 discloses a fishing rod holder for insertion into an existing beverage holder opening in a boat for the purpose of receiving and supporting the handle end of a fishing rod. The fishing rod holder includes a tubular body member having a flange at its upper end and a tubular receiver secured within the body member. The handle end of the fishing rod can be inserted into and retained within the tubular receiver.

U.S. Pat. No. 5,054,738 discloses a device for use by fishermen in and around fishing docks and boats which is designed to securely hold one or more fishing rods along with a beverage container. The device is of compact, integral metallic construction and includes a pair of fishing rod-receiving bodies each equipped with a beverage container-engaging segment rigidly secured thereto. The bodies are in turn supported for releasable connection to a rail or the like by means of an elongated channel of inverted, U-shaped configuration.

U.S. Pat. No. 7,200,967 discloses a device for insertion into an existing beverage holder opening in a boat, and receiving and supporting a handle of any length of a fishing rod. The device includes a cup and a tube. The cup is inserted into the existing beverage holder opening in the boat. The tube extends into, and upwardly, at an angle from, the cup, receives and supports the handle of the fishing rod, and has a bottom that is open so as to allow the handle of any length of the fishing rod to pass therethrough and be received and supported by the tube.

U.S. Published Patent Application No. 2006/0261234 discloses a beverage holder that removably engages a fishing rod holder. In one embodiment, the beverage holder includes a beverage receiving portion and a rod holder mating portion orientated at an acute angle relative to a center line of the beverage receiving portion. The beverage receiving portion is configured to retain a beverage container in a beverage container receiving pocket.

SUMMARY OF THE INVENTION

A combined fishing rod and beverage holder for insertion into and removal from an opening in a marine vessel is disclosed. The combined fishing rod and beverage holder includes a substantially tubular hollow cylindrical member which is formed with an upper portion and a lower portion. The upper portion has a diameter which is larger than the diameter of the lower portion. The diameter of the upper portion enables a beverage container with or without an insulating jacket to be placed within and retained within the upper portion of the combined rod and beverage holder. The upper portion includes an outwardly projecting flange which includes apertures through which fasteners can be placed to secure the combined rod and beverage holder to a surface, such as a gunwale of a marine vessel. Other types or secure devices can also be employed to secure the combined rod and beverage holder to any surface.

Accordingly, it is an objective of the instant invention to provide a device which is a combined fishing rod and beverage container holder.

It is a further objective of the instant invention to provide a combined fishing rod and beverage container holder which can be readily secured to a surface such as a gunwale of a marine vessel.

It is yet another objective of the instant invention to provide a combined fishing rod and beverage container holder wherein the beverage holder can readily hold and retain a beverage container with or without an insulating jacket on the beverage container.

It is a still further objective of the invention to provide a combined fishing rod and beverage container holder wherein a device is provided in the fishing rod holder which prevents rotation of the fishing rod while it is positioned within the rod holder.

It is yet another objective of the instant invention to provide a combined fishing rod and beverage container holder wherein the beverage holder includes a resilient ring or washer to retain the beverage container.

It is yet another objective of the instant invention to provide a combined fishing rod and beverage container holder wherein the beverage holder includes a plurality of resilient members to retain the beverage container.

It is yet another objective of the instant invention to provide a combined fishing rod and beverage container holder including an upper portion and a lower portion. The lower portion is secured to the upper portion at an angle with respect to the centerline of the upper and lower portions.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 3 is a side view of a first embodiment of the present invention;

FIG. 4 is a front end view of a first embodiment of the present invention;

FIG. 5 is a rear end view of a first embodiment of the present invention;

FIG. 6 is a top view of a first embodiment of the present invention;

FIG. 7 is a bottom view of a first embodiment of the present invention;

FIG. 10 is a side view of a second embodiment of the present invention;

FIG. 11 is a front view of a second embodiment of the present invention;

FIG. 15 is a side view of a third embodiment of the present invention;

FIG. 16 is a top view of a third embodiment of the present invention;

FIG. 17 is a bottom view of third embodiment of the present invention;

FIG. 21 is front view of a fourth embodiment of the present invention;

FIG. 22 is a rear view of a fourth embodiment of the present invention;

FIG. 29 is a rear view of a fifth embodiment of the present invention;

FIG. 30 is a top view of a fifth embodiment of the present invention;

FIG. 31 is a bottom view of a fifth embodiment of the present invention;

FIGS. 32 A-C are the different angles that the fifth embodiment of the present invention can be formed to;

FIGS. 33 A-C are the different angles that the fifth embodiment of the present invention can be formed to;

FIGS. 34 A-C are the different angles that the fourth embodiment of the present invention can be formed to;

FIGS. 35 A-C are the different angles that the fourth embodiment of the present invention can be formed to;

FIG. 43 is a bottom perspective view of the fourth embodiment of the present invention with a first type of fishing rod holder;

FIG. 44 is a bottom perspective view of the fourth embodiment of the present invention with a second type of fishing rod holder;

FIG. 45 is a bottom perspective view of the fourth embodiment of the present invention with a third type of fishing rod holder;

DETAILED DESCRIPTION OF THE INVENTION

Figure 1:
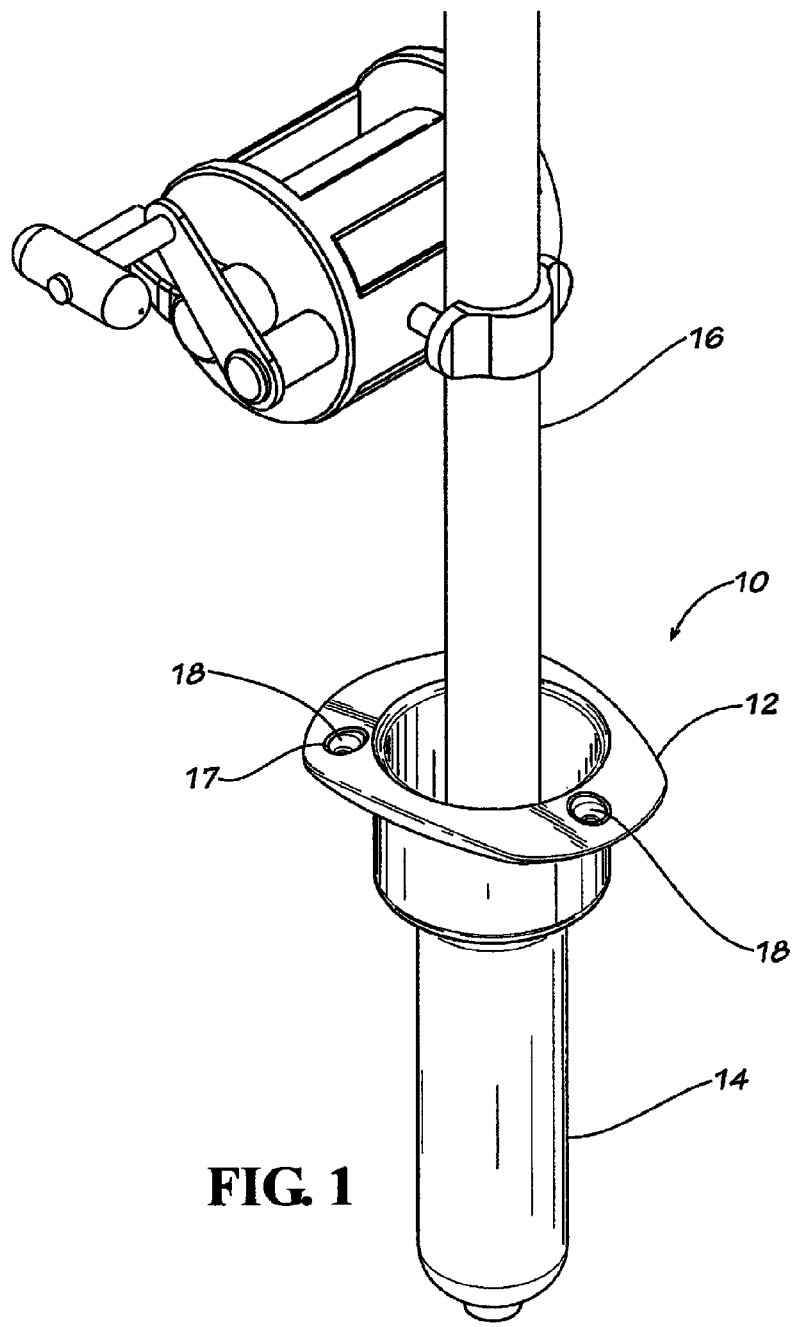
FIG. 1 is a top perspective view of a first embodiment of the present invention with a fishing rod.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 55:
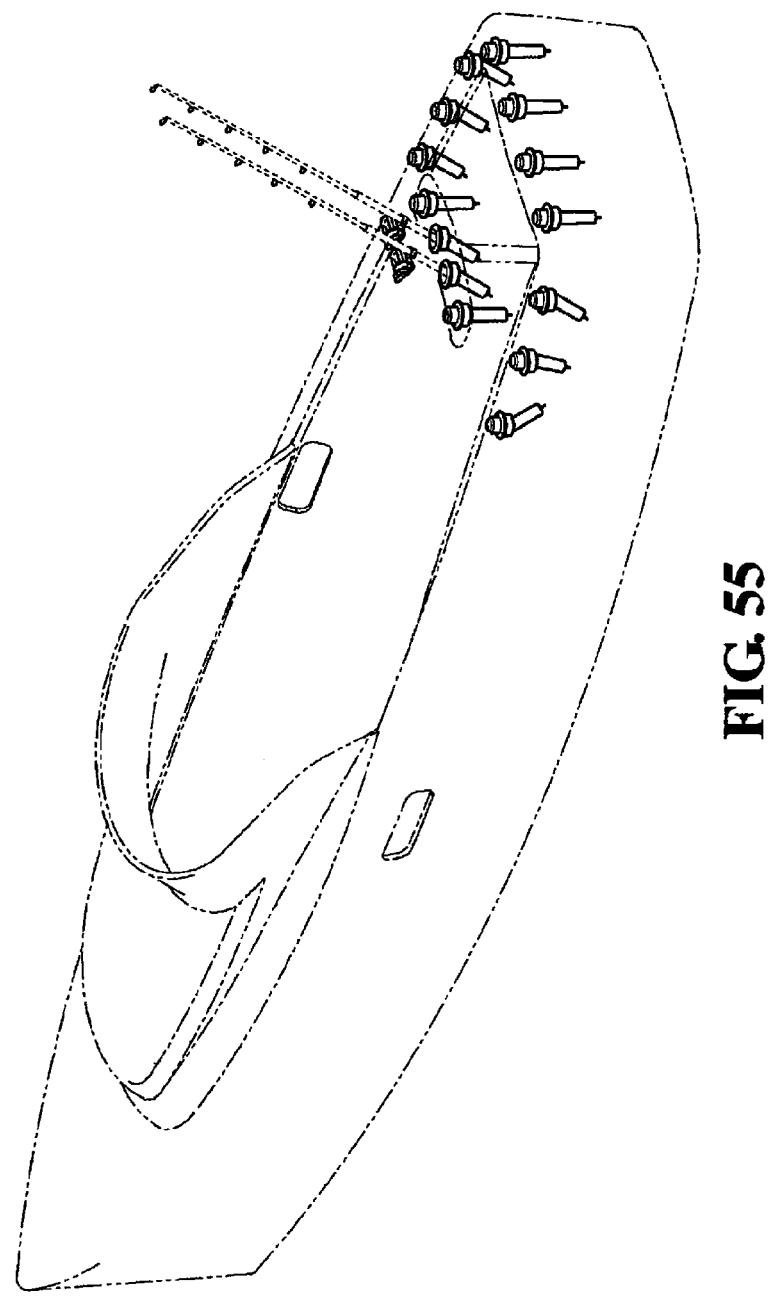
FIG. 55 illustrates a plurality of the present invention devices used on a boat.

Referring to FIGS. 1-55, in which like numerals indicate like parts, a combined fishing rod holder and beverage container holder will now be described. FIGS. 1-7 illustrate a preferred first embodiment of the present invention. A combined fishing rod holder and beverage holder 10 is preferably formed as a tubular cylindrical member which includes an upper portion 12 and a lower portion 14. The upper and lower portions are preferably permanently secured together. However, in certain instances the upper and lower portions can be readily removably secured together by means such as threaded connections, friction connections, telescoping connections with or without additional fasteners, or any other suitable connection means. FIG. 1 illustrates a fishing rod 16 securely held in the combined fishing rod and beverage holder. The fishing rod is securely held in position by the size of the diameter of the lower portion of the rod and beverage holder. The relationship between the diameter of the fishing rod and the lower portion of the rod and beverage holder permits the fishing rod to be easily placed within the rod holder, securely retained therein and readily removed from the rod holder when a fish is on the line. The relationship between the fishing rod and the rod holder is such that the fishing rod will remain in the rod holder during various conditions that are encountered in a marine vessel on the water. Fasteners 18 secure the combined fishing rod holder and beverage holder to the marine vessel in various locations such as on a gunwale, a stern portion, a bow portion or any other suitable portion of the marine vessel. The fasteners 18 are secured through apertures 17 in a flange 19 which completely surrounds the upper portion of the combined fishing rod and beverage container holder of the first embodiment. Flange 19 can also partially surround the upper portion of the combined fishing rod and beverage container holder.

Figure 2:
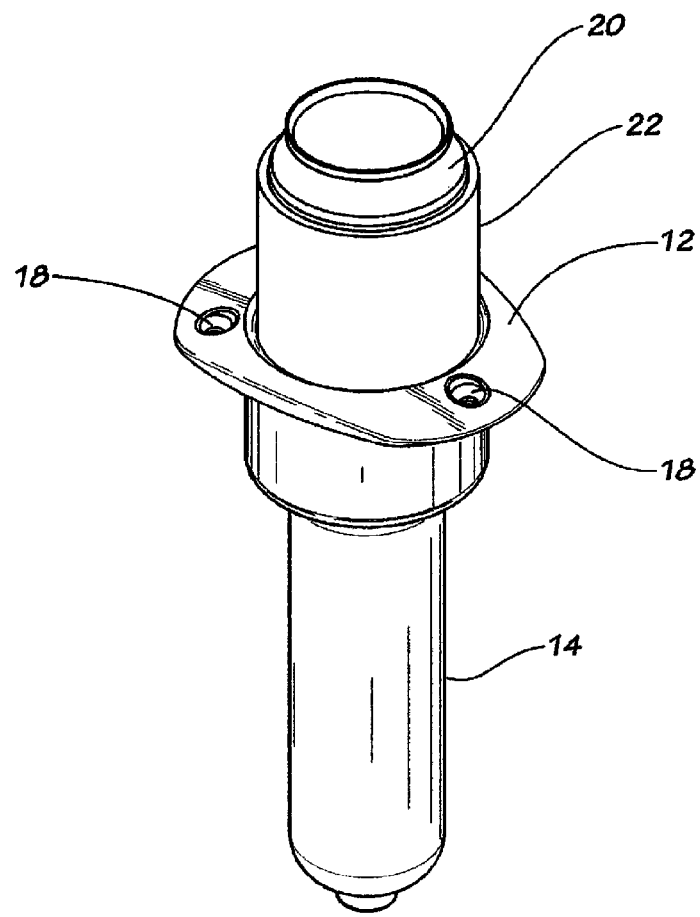
FIG. 2. is a top perspective view of a first embodiment of the present invention with a beverage container.

FIG. 2 illustrates the manner in which the upper portion of the combined fishing rod holder and beverage holder is constructed and arranged to hold and retain a beverage container 20. While the beverage container is illustrated as a can, the container could also be a bottle, a glass or any other type of container which is capable of retaining a fluid. The beverage container 20 in FIG. 2 also includes an insulated sleeve or jacket 22. This sleeve or jacket 22 is readily securable to and removable from the beverage container. The sleeve or jacket serves a dual function, in that it keeps the beverage container cold or hot and also insulates the temperature of the beverage container from a user's hand, thereby providing protection from injury to a user's hand from an extreme temperature of a beverage container.

A flexible ring or gasket 21 having a plurality of fingers 23 is illustrated in FIG. 6. This ring or gasket is formed from a material which is flexible, yet sufficiently resilient to retain a beverage container placed within the beverage holder. In place of the ring or gasket 21 a plurality of fingers or separate members 23 formed from a material which is flexible, yet sufficiently resilient to retain a beverage container placed within the beverage holder could be employed.

FIGS. 3, 4 and 5 illustrate side, front and rear views respectively of the first embodiment of the present invention. In FIG. 6 a device 24 is secured across the lower portion of the combined fishing rod and beverage container holder. The device 24 is preferably a bar, or rod which is secured toward a lower end of the lower portion of the combined fishing rod and beverage container holder. The device 24 interacts with a comparable fitting on an end of a fishing rod to securely hold a fishing rod within the combined fishing rod and beverage container holder and prevent rotation of the fishing rod relative to the combined rod and beverage container holder. The lowest end of the lower portion of the combined fishing rod and beverage container holder is normally provided with a drain aperture 26 so that any water or other fluid which collects in the combined rod holder and beverage container holder is drained away from the device and into the bilge of the marine vessel. The drain aperture 26 can also be eliminated or plugged to prevent water and/or fluids from escaping from the combined fishing rod and beverage container holder.

The upper and lower portions of the substantially hollow tubular member have been illustrated as being formed as a single, unitary piece. These upper and lower members can also be secured together to form a single element as by welding or other equivalent means. The upper and lower members are oriented and aligned such that a centerline of the upper member is in substantially straight alignment with a centerline of the lower member. Further, the upper and lower members can be removably secured together. The upper and lower members can be threaded and screwed to each other. They can be telescopically secured to each other. They can be secured by utilizing a bayonet coupling system. The can be secured to each other with removable fasteners.

Figure 8:
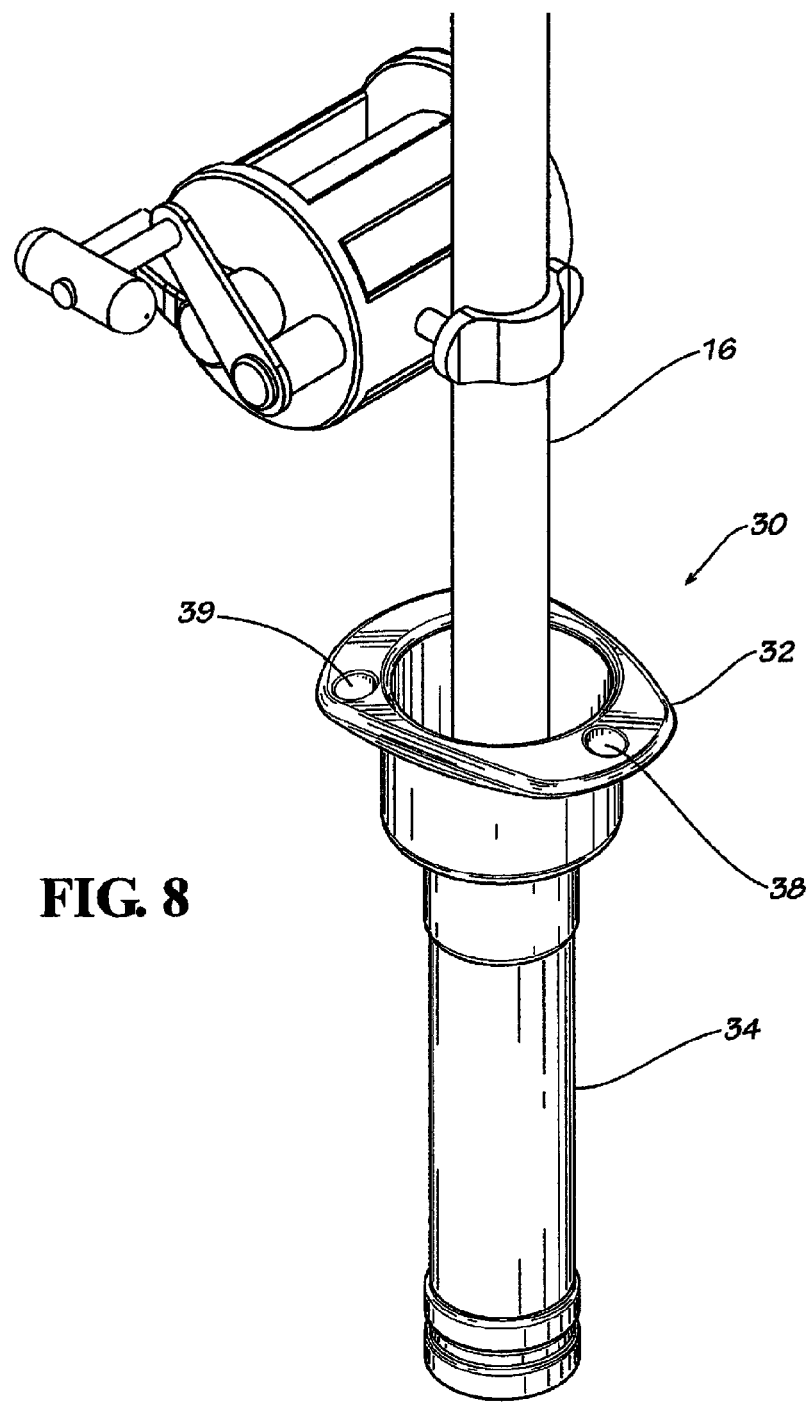
FIG. 8 is a top perspective view of a second embodiment of the present invention with a fishing rod.

FIGS. 8-14 illustrate a second embodiment of the present invention. A combined fishing rod holder and beverage holder 30 is preferably formed as a tubular cylindrical member which includes an upper portion 32 and a lower portion 34. The upper and lower portions are preferably permanently secured together. However, in certain instances the upper and lower portions can be readily removably secured together by means such as threaded connections, friction connections, telescoping connections with or without additional fasteners, or any other suitable connection means. FIG. 8 illustrates a fishing rod 16 securely held in the combined fishing rod and beverage holder. The fishing rod is securely held in position by the size of the diameter of the lower portion of the rod and beverage holder. The relationship between the diameter of the fishing rod and the lower portion of the rod and beverage holder permits the fishing rod to be easily placed within the rod holder, securely retained therein and readily removed from the rod holder when a fish is on the line. The relationship between the fishing rod and the rod holder is such that the fishing rod will remain in the rod holder during various conditions that are encountered in a marine vessel on the water. Fasteners 38 secure the combined fishing rod holder and beverage holder to the marine vessel in various locations such as on a gunwale, a stern portion, a bow portion or any other suitable portion of the marine vessel. The fasteners 38 are secured through a flange 39 which completely surrounds the upper portion of the combined fishing rod and beverage container holder of the first embodiment. Flange 39 can also partially surround the upper portion of the combined fishing rod and beverage container holder.

Figure 9:
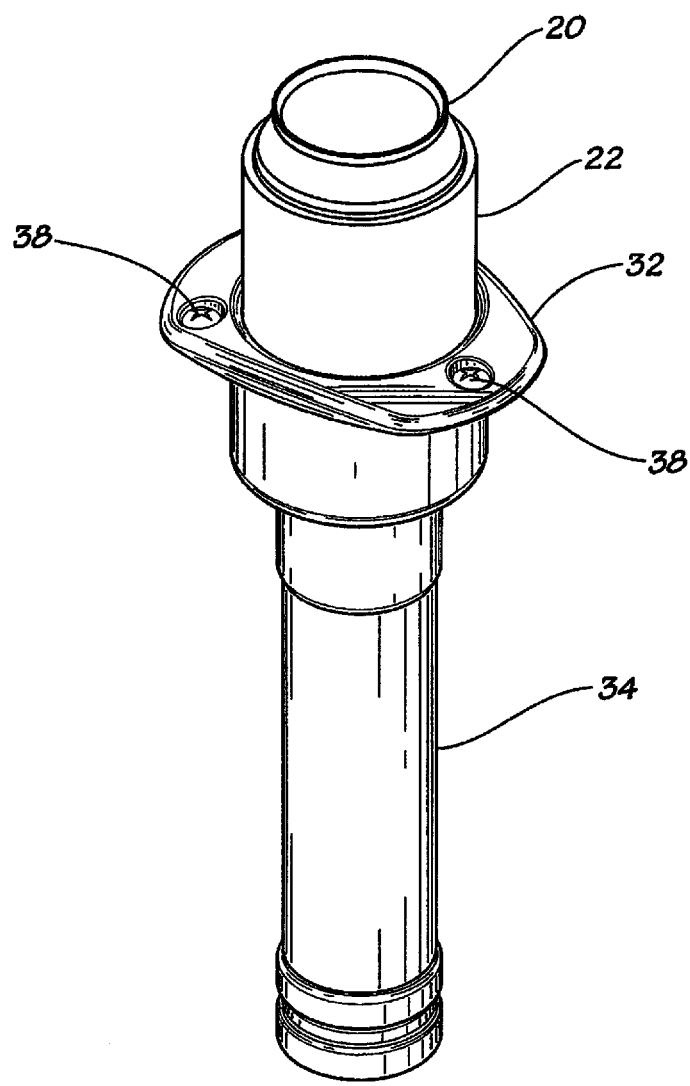
FIG. 9 is a top perspective view of a second embodiment of the present invention with a beverage container.

FIG. 9 illustrates the manner in which the upper portion of the combined fishing rod holder and beverage holder is constructed and arranged to hold and retain a beverage container 20. While the beverage container is illustrated as a can, the container could also be a bottle, a glass or any other type of container which is capable of retaining a fluid. The beverage container 20 in FIG. 9 also includes an insulated sleeve or jacket 22. This sleeve or jacket 22 is readily securable to and removable from the beverage container. The sleeve or jacket serves a dual function, in that it keeps the beverage container cold or hot and also insulates the temperature of the beverage container from a user's hand, thereby providing protection from injury to a user's hand from an extreme temperature of a beverage container.

Figure 13:
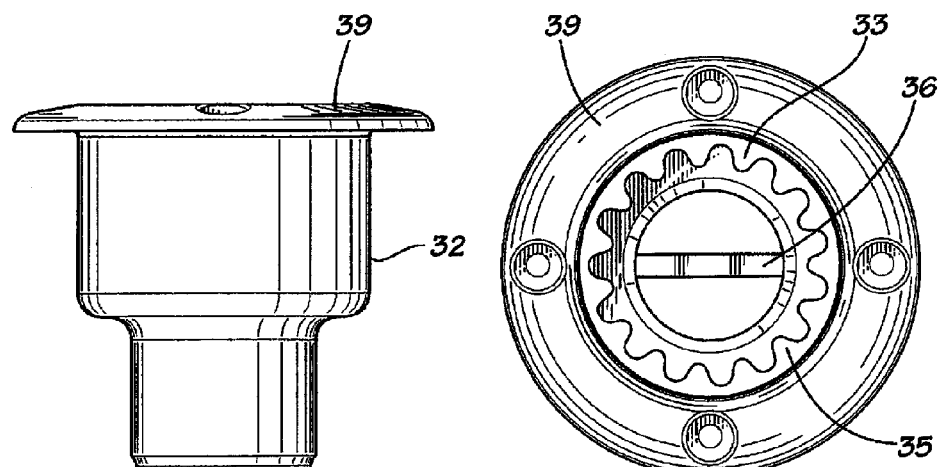
FIG. 13 is a top view of a second embodiment of the present invention.

A flexible ring or gasket 33 is illustrated in FIG. 13. This ring or gasket is located in the upper portion 32 of fishing rod and beverage holder 39. This ring or gasket 33 is formed from a material which is flexible, yet sufficiently resilient to retain a beverage container placed within the beverage holder. In place of the ring or gasket 33 a plurality of fingers or separate members 35 formed from a material which is flexible, yet sufficiently resilient to retain a beverage container placed within the beverage holder could be employed.

Figure 12:
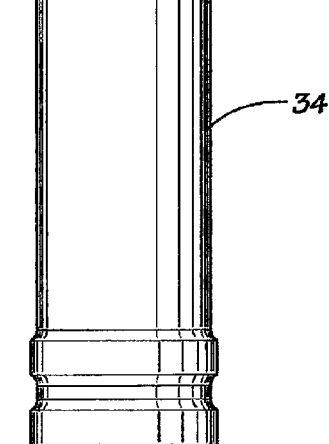
FIG. 12 is a rear view of a second embodiment of the present invention.
Figure 14:
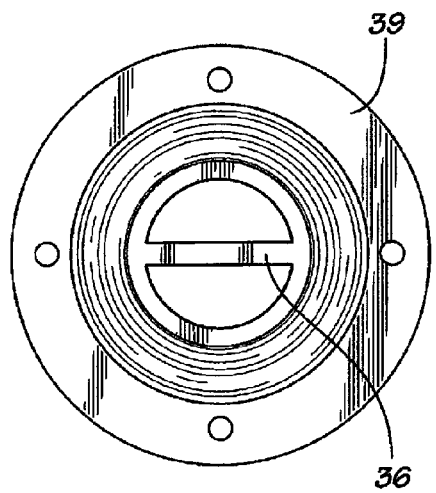
FIG. 14 is a bottom view of a second embodiment of the present invention.

FIGS. 10, 11 and 12 illustrate side, front and rear views respectively of the second embodiment of the present invention. In FIGS. 13 and 14 a device 36 is secured across the lower portion of the combined fishing rod and beverage container holder. The device 36 is preferably a bar or rod which is secured toward a lower end of the lower portion of the combined fishing rod and beverage container holder. The device 36 interacts with a comparable fitting on an end of a fishing rod to securely hold a fishing rod within the combined fishing rod and beverage container holder and prevent rotation of the fishing rod relative to the combined rod and beverage container holder. The lowest end of the lower portion of the combined fishing rod and beverage container holder is normally provided with a drain aperture so that any water or other fluid which collects in the combined rod holder and beverage container holder is drained away from the device and into the bilge of the marine vessel. The drain aperture can also be eliminated or plugged to prevent water and/or fluids from escaping from the combined fishing rod and beverage container holder.

The upper and lower portions of the substantially hollow tubular member have been illustrated as being formed as a single piece. These upper and lower members can also be secured together to form a single element as by welding or other equivalent means. Further, the upper and lower members can be removably secured together. The upper and lower members can be threaded and screwed to each other. They can be telescopically secured to each other. They can be secured by utilizing a bayonet coupling system. The can be secured to each other with removable fasteners.

FIGS. 15-17 illustrate a third embodiment of the present invention. A combined fishing rod holder and beverage holder 40 is preferably formed as a tubular cylindrical member which includes an upper portion 42 and a lower portion 44. The upper and lower portions are preferably permanently secured together. However, in certain instances the upper and lower portions can be readily removably secured together by means such as threaded connections, friction connections, telescoping connections with or without additional fasteners, or any other suitable connection means. A fishing rod can be securely held in the combined fishing rod and beverage holder. The fishing rod is securely held in position by the size of the diameter of the lower portion of the rod and beverage holder. The relationship between the diameter of the fishing rod and the lower portion of the rod and beverage holder permits the fishing rod to be easily placed within the rod holder, securely retained therein and readily removed from the rod holder when a fish is on the line. The relationship between the fishing rod and the rod holder is such that the fishing rod will remain in the rod holder during various conditions that are encountered in a marine vessel on the water. Fasteners 46 secure the combined fishing rod holder and beverage holder to the marine vessel in various locations such as on a gunwale, a stern portion, a bow portion or any other suitable portion of the marine vessel. The fasteners 46 are secured through a flange 48 which completely surrounds the upper portion of the combined fishing rod and beverage container holder of the first embodiment. Flange 48 can also partially surround the upper portion of the combined fishing rod and beverage container holder.

Figure 19:
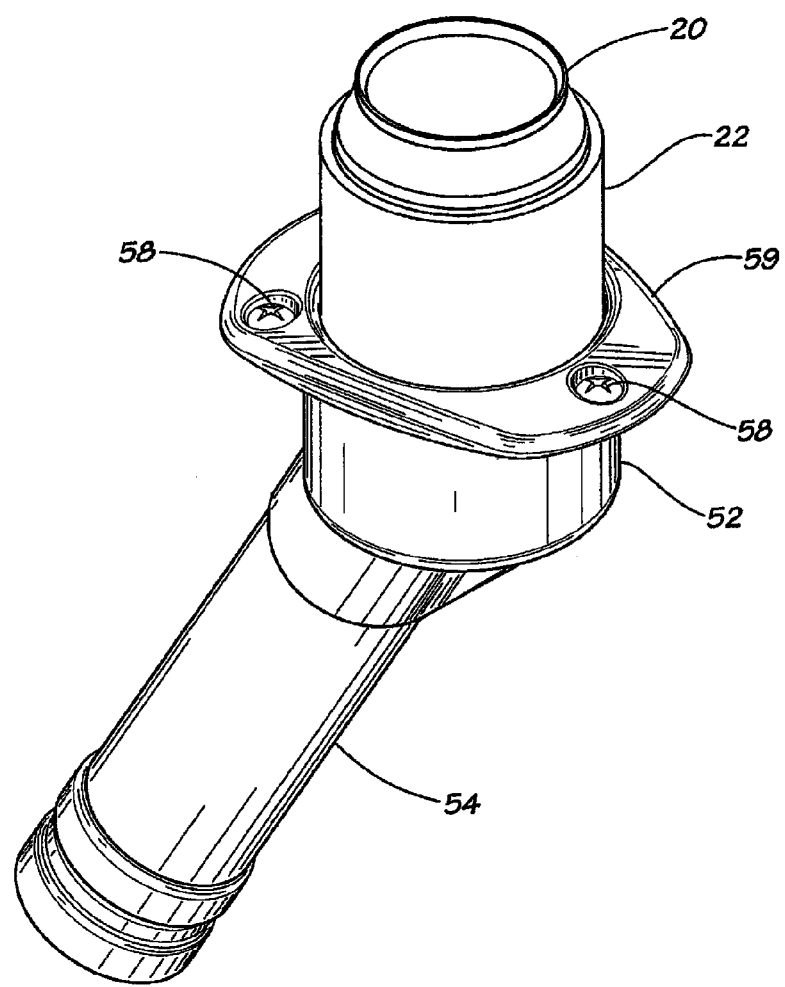
FIG. 19 is a top perspective view of a fourth embodiment of the present invention including a beverage container.

FIG. 19 illustrates the manner in which the upper portion 52 of the combined fishing rod holder and beverage holder is constructed and arranged to hold and retain a beverage container. While the beverage container is illustrated as a can, the container could also be a bottle, a glass or any other type of container which is capable of retaining a fluid. The beverage container also includes an insulated sleeve or jacket 22. This sleeve or jacket is readily securable to and removable from the beverage container. The sleeve or jacket serves a dual function, in that it keeps the beverage container cold or hot and also insulates the temperature of the beverage container from a user's hand, thereby providing protection from injury to a user's hand from an extreme temperature of a beverage container.

A flexible ring or gasket 47 is illustrated in FIG. 16. This ring or gasket is formed from a material which is flexible, yet sufficiently resilient to retain a beverage container placed within the beverage holder. In place of the ring or gasket 47 a plurality of fingers or separate members 49 formed from a material which is flexible, yet sufficiently resilient to retain a beverage container placed within the beverage holder could be employed.

FIG. 16 illustrates a top view of the present invention wherein a device 45 is secured across the lower portion 44 of the combined fishing rod and beverage container holder. The device 45 is preferably two bars or rods which are secured in a cross shape toward a lower end of the lower portion of the combined fishing rod and beverage container holder. The device 45 interacts with a comparable fitting on an end of a fishing rod to securely hold a fishing rod within the combined fishing rod and beverage container holder and prevent rotation of the fishing rod relative to the combined rod and beverage container holder. The lowest end of the lower portion of the combined fishing rod and beverage container holder is normally provided with a drain aperture so that any water or other fluid which collects in the combined rod holder and beverage container holder is drained away from the device and into the bilge of the marine vessel. The drain aperture can also be eliminated or plugged to prevent water and/or fluids from escaping from the combined fishing rod and beverage container holder.

The upper and lower portions of the substantially hollow tubular member have been illustrated as being formed as a single piece. These upper and lower members can also be secured together to form a single element as by welding or other equivalent means. Further, the upper and lower members can be removably secured together. The upper and lower members can be threaded and screwed to each other. They can be telescopically secured to each other. They can be secured by utilizing a bayonet coupling system. The can be secured to each other with removable fasteners.

Figure 18:
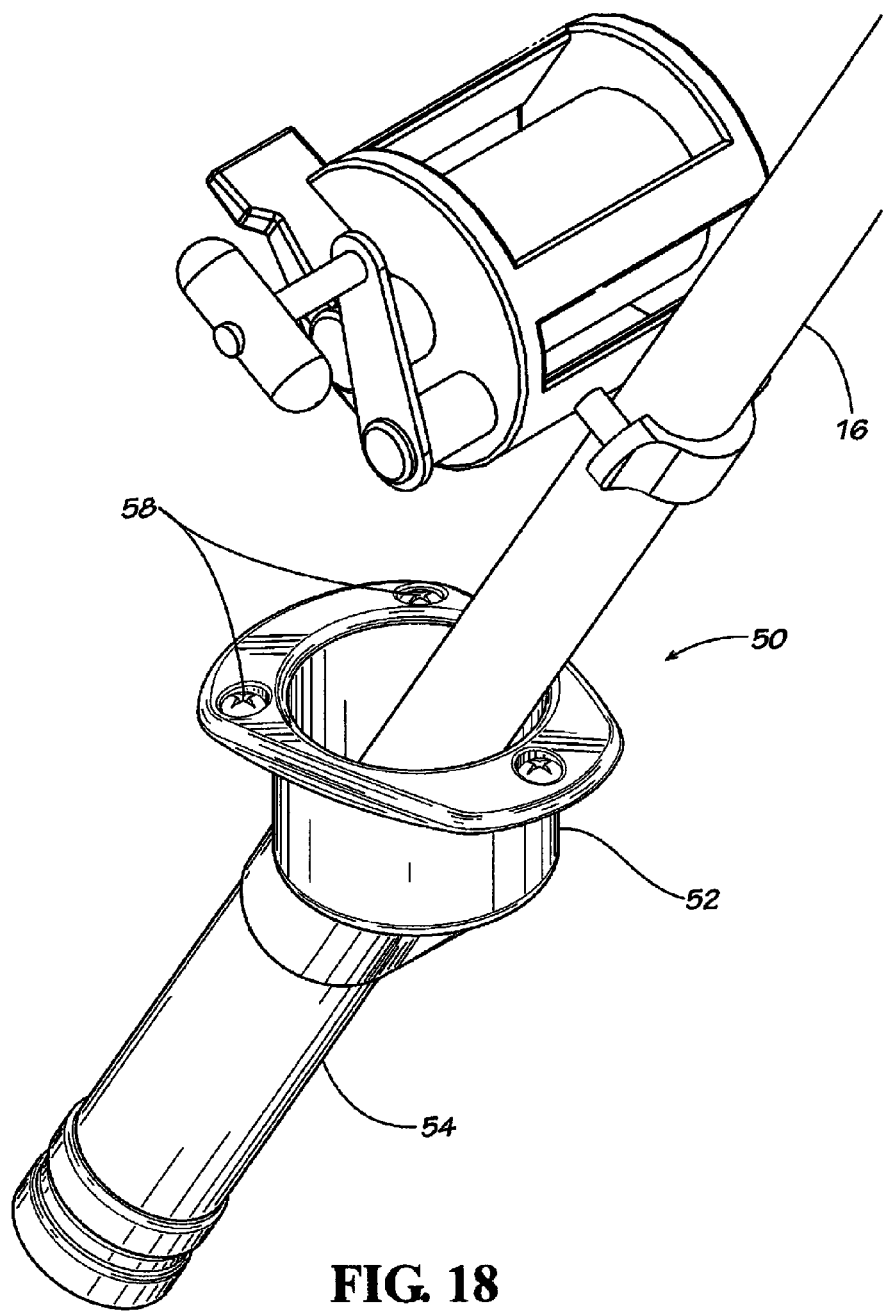
FIG. 18 is a top perspective view of a fourth embodiment of the present invention including a fishing rod.

FIGS. 18-24 illustrate a fourth embodiment of the present invention. A combined fishing rod holder and beverage holder 50 is preferably formed as a tubular cylindrical member which includes an upper portion 52 and a lower portion 54. The upper and lower portions are preferably permanently secured together. However, in certain instances the upper and lower portions can be readily removably secured together by means such as threaded connections, friction connections, telescoping connections with or without additional fasteners, or any other suitable connection means. In the fourth embodiment of the present invention, lower portion 54 is secured to the upper portion 52 wherein the centerlines of the upper and lower portions respectively are at an angle with respect to each other. The angle can be between 1 and approximately 90 degrees. A preferred range is between 10 to 40 degrees. In the fourth embodiment, the angle illustrated is approximately 40 degrees. FIG. 18 illustrates a fishing rod 16 securely held in the combined fishing rod and beverage holder. The fishing rod is securely held in position by the size of the diameter of the lower portion of the rod and beverage holder. The relationship between the diameter of the fishing rod and the lower portion of the rod and beverage holder permits the fishing rod to be easily placed within the rod holder, securely retained therein and readily removed from the rod holder when a fish is on the line. The relationship between the fishing rod and the rod holder is such that the fishing rod will remain in the rod holder during various conditions that are encountered in a marine vessel on the water. Fasteners 58 secure the combined fishing rod holder and beverage holder to the marine vessel in various locations such as on a gunwale, a stern portion, a bow portion or any other suitable portion of the marine vessel. The fasteners 58 are secured through a flange 59 which completely surrounds the upper portion of the combined fishing rod and beverage container holder of the first embodiment. Flange 59 can also partially surround the upper portion of the combined fishing rod and beverage container holder.

FIG. 19 illustrates the manner in which the upper portion of the combined fishing rod holder and beverage holder is constructed and arranged to hold and retain a beverage container 20. While the beverage container is illustrated as a can, the container could also be a bottle, a glass or any other type of container which is capable of retaining a fluid. The beverage container 20 in FIG. 19 also includes an insulated sleeve or jacket 22. This sleeve or jacket 22 is readily securable to and removable from the beverage container. The sleeve or jacket serves a dual function, in that it keeps the beverage container cold or hot and also insulates the temperature of the beverage container from a user's hand. Thereby providing protection from injury to a user's hand from an extreme temperature of a beverage container.

Figure 23:
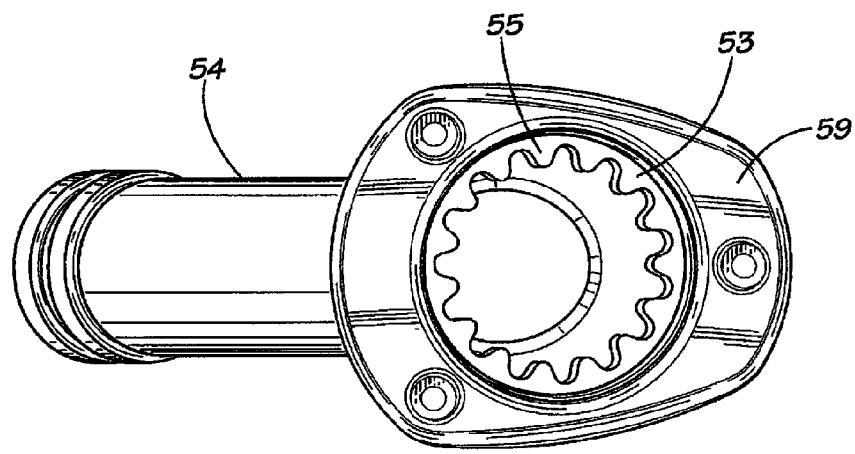
FIG. 23 is a top view of a fourth embodiment of the present invention.

A flexible ring or gasket 53 is illustrated in FIG. 23. This ring or gasket is formed from a material which is flexible, yet sufficiently resilient to retain a beverage container placed within the beverage holder. In place of the ring or gasket 53 a plurality of fingers or separate members 55 formed from a material which is flexible, yet sufficiently resilient to retain a beverage container placed within the beverage holder could be employed.

Figure 20:
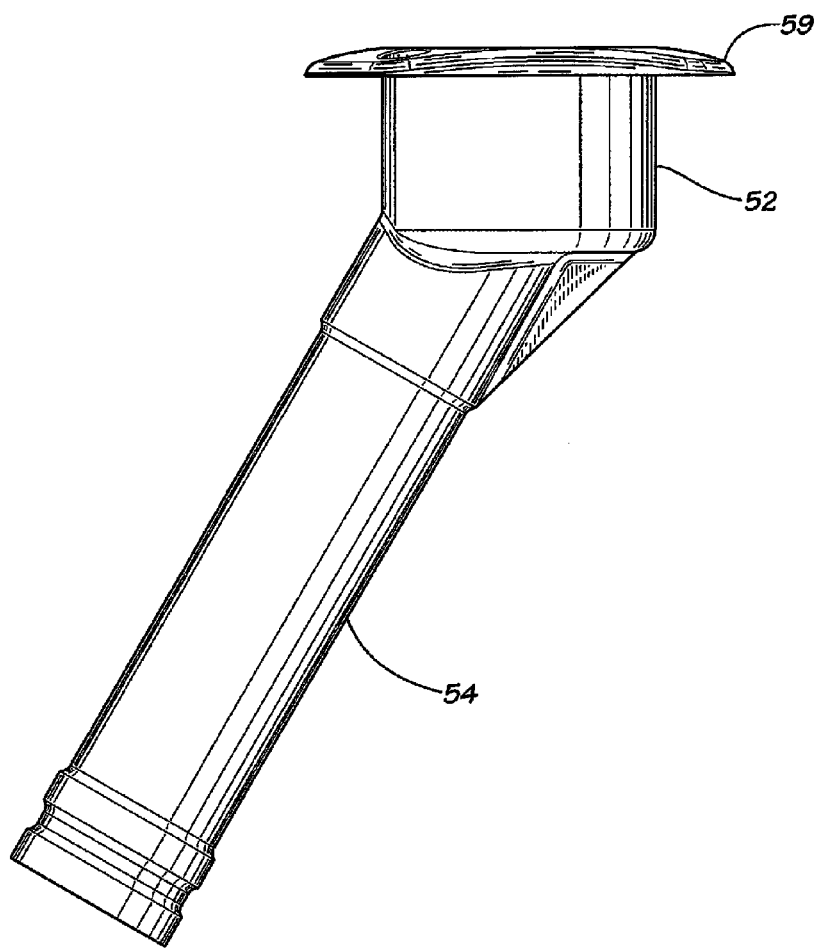
FIG. 20 is a side view of a fourth embodiment of the present invention.
Figure 24:
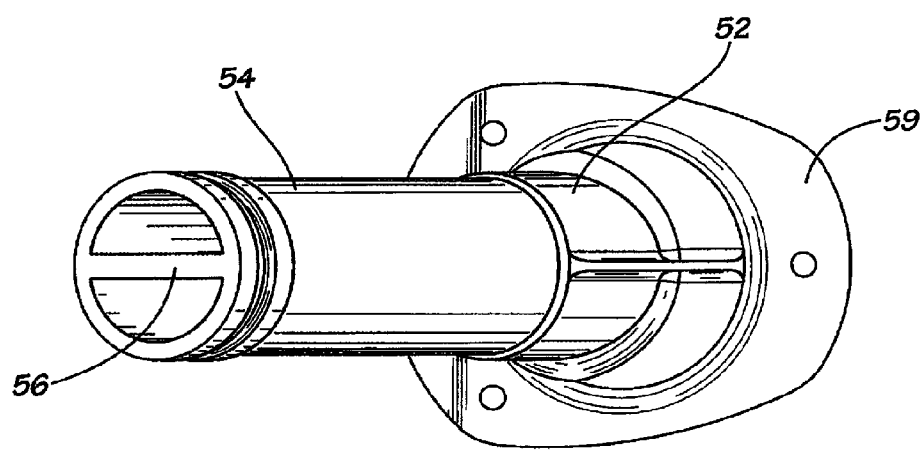
FIG. 24 is a bottom view of fourth embodiment of the present invention.

FIGS. 20, 21 and 22 illustrate side, front and rear views respectively of the second embodiment of the present invention. In FIGS. 21 and 24 a device 56 is secured across the lower portion of the combined fishing rod and beverage container holder. The device 56 is preferably a bar or rod which is secured toward a lower end of the lower portion of the combined fishing rod and beverage container holder. The device 56 interacts with a comparable fitting on an end of a fishing rod to securely hold a fishing rod within the combined fishing rod and beverage container holder and prevent rotation of the fishing rod relative to the combined rod and beverage container holder. The lowest end of the lower portion of the combined fishing rod and beverage container holder is not provided with a drain aperture so that any water or other fluid which collects in the combined rod holder and beverage container holder is drained away from the device and into the bilge of the marine vessel. The drain aperture can also be eliminated or plugged to prevent water and/or fluids from escaping from the combined fishing rod and beverage container holder.

The upper and lower portions of the substantially hollow tubular member have been illustrated as being formed as a single piece. These upper and lower members can also be secured together to form a single element as by welding or other equivalent means. Further, the upper and lower members can be removably secured together. The upper and lower members can be threaded and screwed to each other. They can be telescopically secured to each other. They can be secured by utilizing a bayonet coupling system. The can be secured to each other with removable fasteners.

Figure 25:
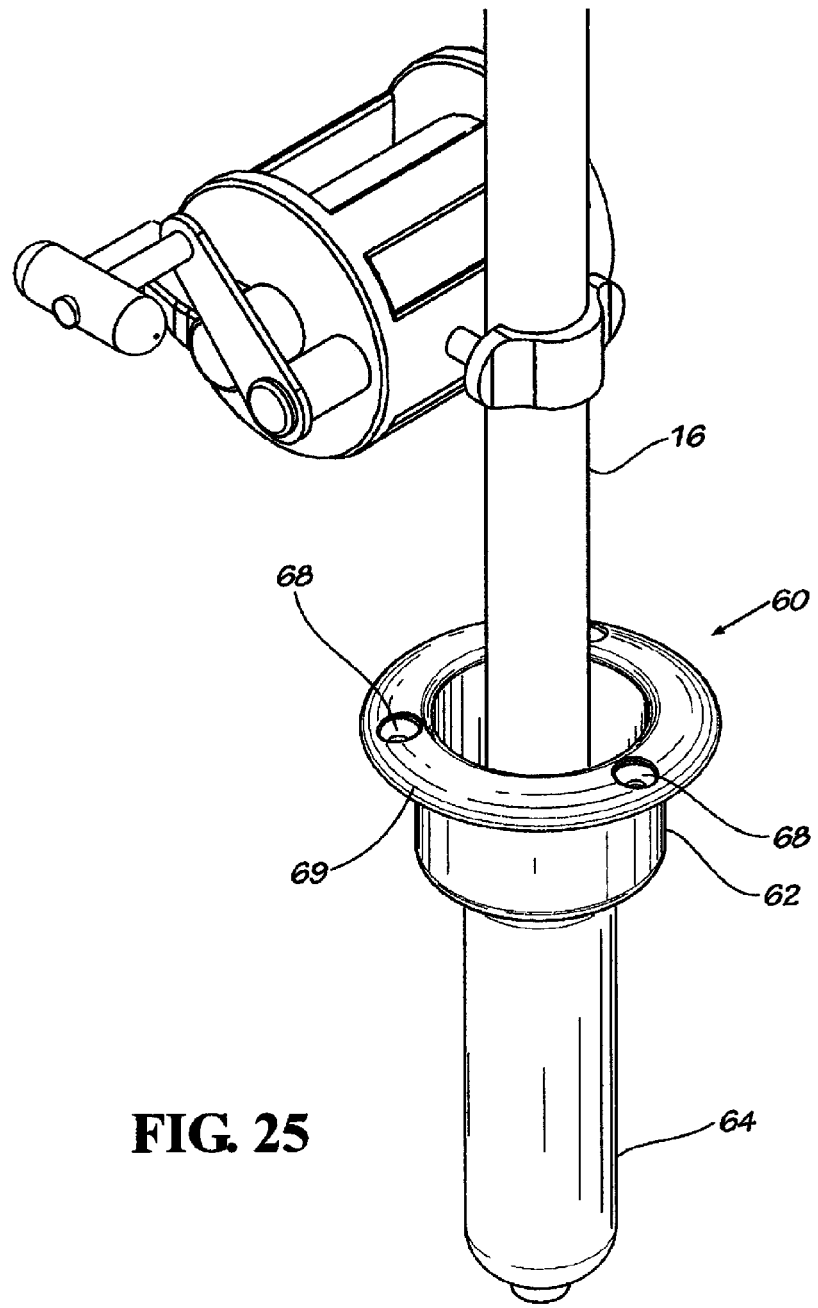
FIG. 25 is a top perspective view of a fifth embodiment of the present invention including a fishing rod.

FIGS. 25-31 illustrate a fifth embodiment of the present invention. A combined fishing rod holder and beverage holder 60 is preferably formed as a tubular cylindrical member which includes an upper portion 62 and a lower portion 64. The upper and lower portions are preferably permanently secured together. However, in certain instances the upper and lower portions can be readily removably secured together by means such as threaded connections, friction connections, telescoping connections with or without additional fasteners, or any other suitable connection means. FIG. 25 illustrates a fishing rod 16 securely held in the combined fishing rod and beverage holder. The fishing rod is securely held in position by the size of the diameter of the lower portion of the rod and beverage holder. The relationship between the diameter of the fishing rod and the lower portion of the rod and beverage holder permits the fishing rod to be easily placed within the rod holder, securely retained therein and readily removed from the rod holder when a fish is on the line. The relationship between the fishing rod and the rod holder is such that the fishing rod will remain in the rod holder during various conditions that are encountered in a marine vessel on the water. Fasteners 68 secure the combined fishing rod holder and beverage holder to the marine vessel in various locations such as on a gunwale, a stern portion, a bow portion or any other suitable portion of the marine vessel. The fasteners 68 are secured through a flange 69 which completely surrounds the upper portion of the combined fishing rod and beverage container holder of the first embodiment. Flange 69 can also partially surround the upper portion of the combined fishing rod and beverage container holder.

Figure 26:
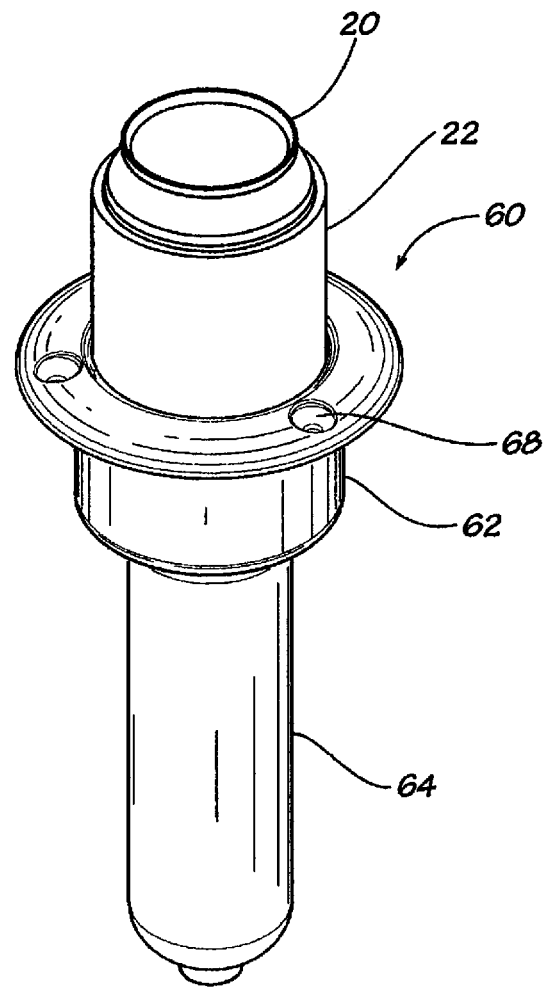
FIG. 26 is a top perspective view of a fifth embodiment of the present invention including a beverage container.

FIG. 26 illustrates the manner in which the upper portion of the combined fishing rod holder and beverage holder is constructed and arranged to hold and retain a beverage container 20. While the beverage container is illustrated as a can, the container could also be a bottle, a glass or any other type of container which is capable of retaining a fluid. The beverage container 20 in FIG. 26 also includes an insulated sleeve or jacket 22. This sleeve or jacket 22 is readily securable to and removable from the beverage container. The sleeve or jacket serves a dual function, in that it keeps the beverage container cold or hot and also insulates the temperature of the beverage container from a user's hand, thereby providing protection from injury to a user's hand from an extreme temperature of a beverage container.

A flexible ring or gasket 63 is illustrated in FIG. 30. This ring or gasket is formed from a material which is flexible, yet sufficiently resilient to retain a beverage container placed within the beverage holder. In place of the ring or gasket 63 a plurality of fingers or separate members 65 formed from a material which is flexible, yet sufficiently resilient to retain a beverage container placed within the beverage holder could be employed.

Figure 27:
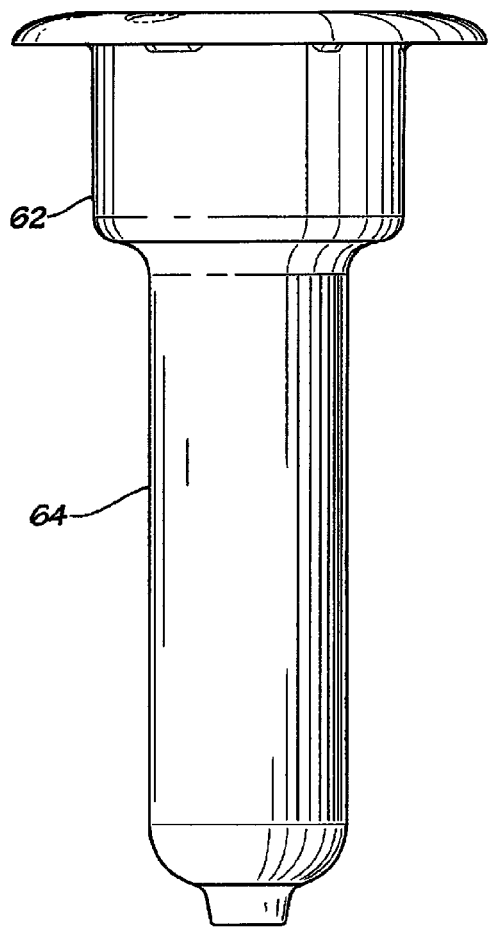
FIG. 27 is a side view of a fifth embodiment of the present invention.
Figure 28:
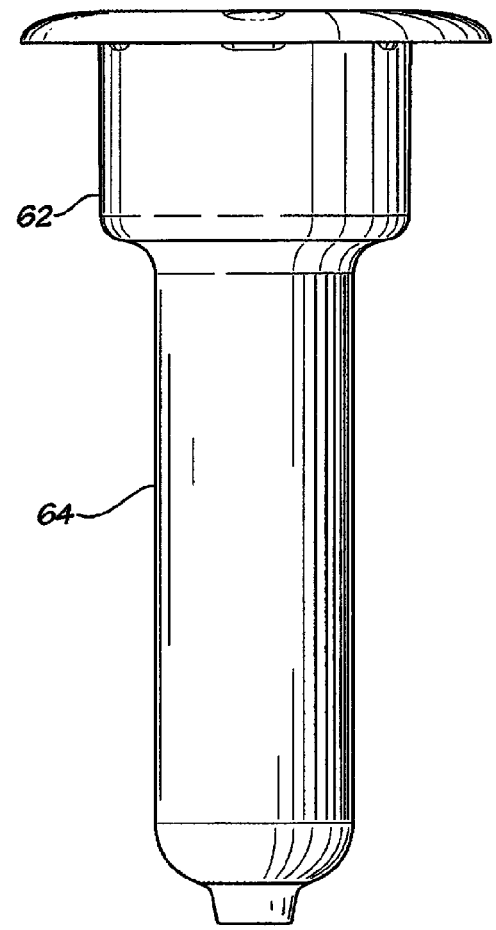
FIG. 28 is a front view of a fifth embodiment of the present invention.

FIGS. 27, 28 and 29 illustrate side, front and rear views respectively of the fifth embodiment of the present invention. In FIG. 30 a device 66 is secured across the lower portion of the combined fishing rod and beverage container holder. The device 66 is preferably a bar or rod which is secured toward a lower end of the lower portion of the combined fishing rod and beverage container holder. The device 66 interacts with a comparable fitting on an end of a fishing rod to securely hold a fishing rod within the combined fishing rod and beverage container holder and prevent rotation of the fishing rod relative to the combined rod and beverage container holder. The lowest end of the lower portion of the combined fishing rod and beverage container holder is normally provided with a drain aperture so that any water or other fluid which collects in the combined rod holder and beverage container holder is drained away from the device and into the bilge of the marine vessel. The drain aperture can also be eliminated or plugged to prevent water and/or fluids from escaping from the combined fishing rod and beverage container holder.

The upper and lower portions of the substantially hollow tubular member have been illustrated as being formed as a single piece. These upper and lower members can also be secured together to form a single element as by welding or other equivalent means. Further, the upper and lower members can be removably secured together. The upper and lower members can be threaded and screwed to each other. They can be telescopically secured to each other. They can be secured by utilizing a bayonet coupling system. The can be secured to each other with removable fasteners.

Figure 32A:
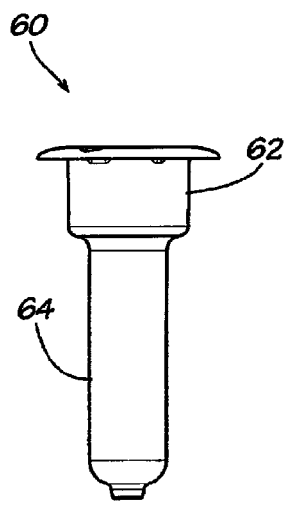
Figure 32B:
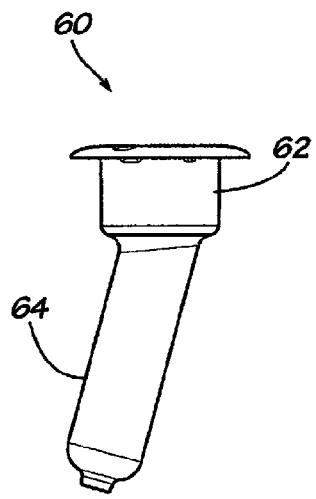
Figure 32C:
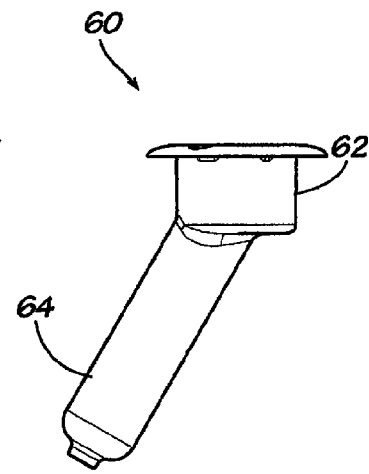
Figure 33A:
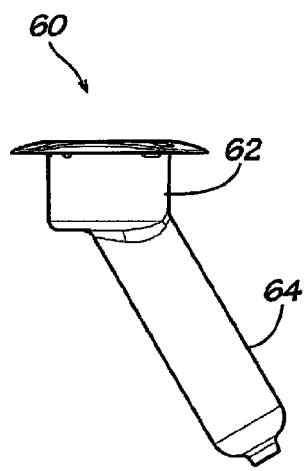
Figure 33B:
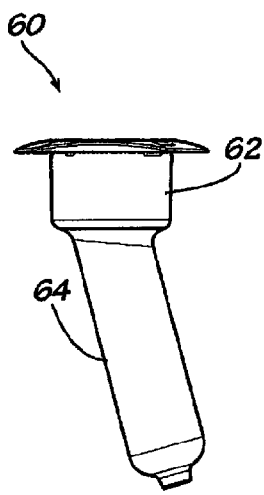
Figure 33C:
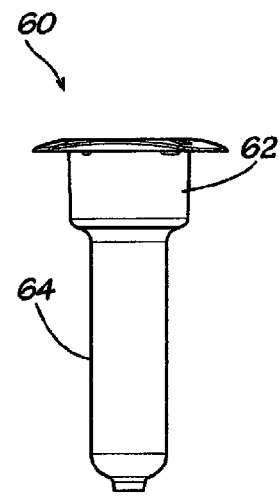

FIGS. 32 A-C and 33 A-C illustrate the fifth embodiment of the present invention. A combined fishing rod holder and beverage holder 60 is preferably formed as a tubular cylindrical member which includes an upper portion 62 and a lower portion 64. The upper and lower portions are preferably permanently secured together at various different angles.

FIGS. 34 A-C and 35 A-C illustrate the fourth embodiment of the present invention. A combined fishing rod holder and beverage holder 50 is preferably formed as a tubular cylindrical member which includes an upper portion 52 and a lower portion 54. The upper and lower portions are preferably permanently secured together at various different angles.

Figure 36:
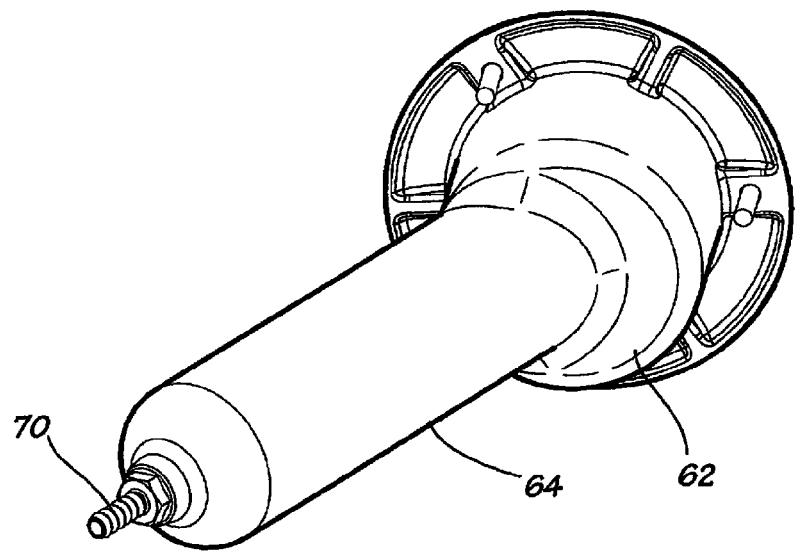
FIG. 36 is a bottom perspective view of the fourth embodiment of the present invention illustrating a drain feature.
Figure 37:
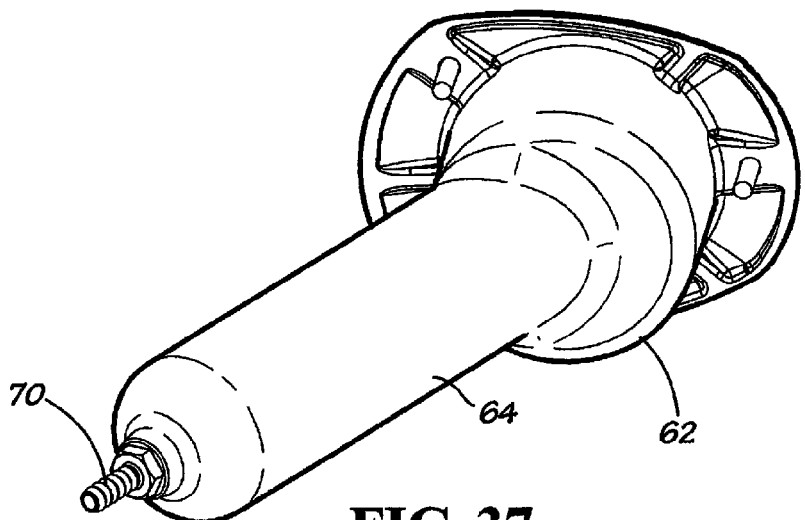
FIG. 37 is a bottom perspective view of the fourth embodiment of the present invention illustrating a drain feature.
Figure 38:
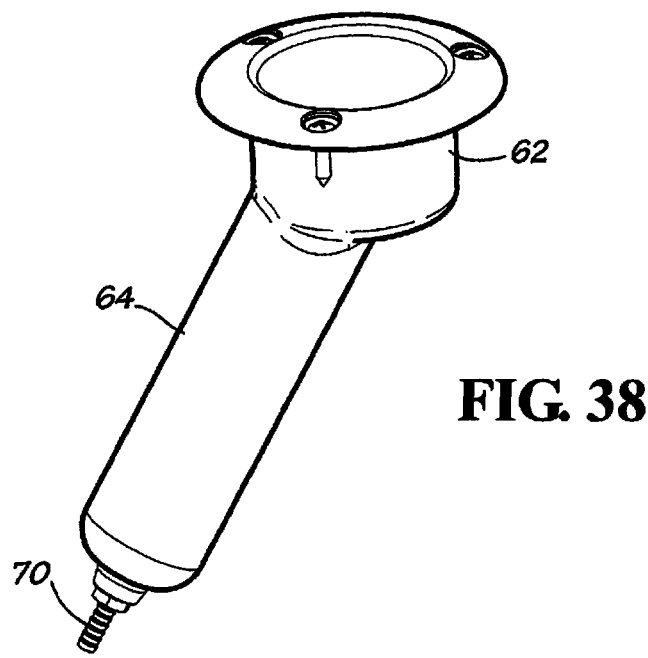
FIG. 38 is a top perspective view of the fourth embodiment of the present invention illustrating a drain feature.

FIGS. 36-38 illustrate the fifth embodiment including a drain hole 73 to remove water and other fluids which may collect in the rod holder.

Figure 39:
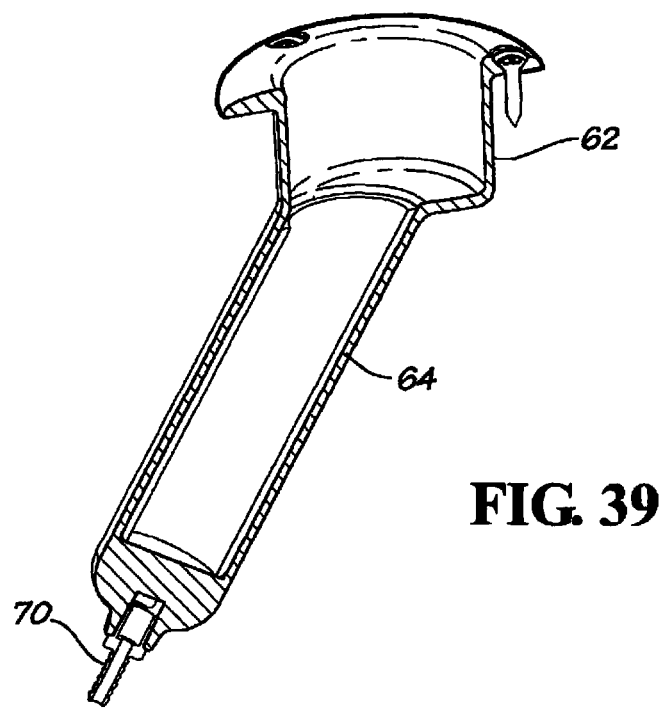
FIG. 39 is a sectional view of the fourth embodiment of the present invention illustrating a drain feature.
Figure 40:
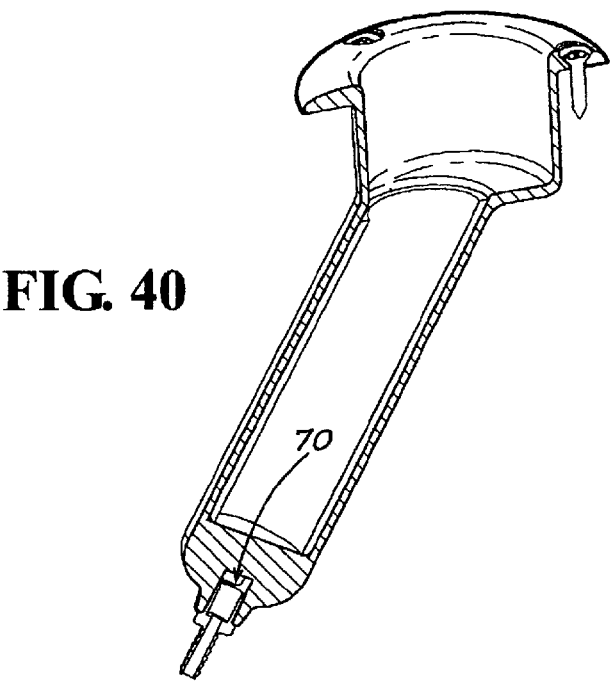
FIG. 40 is a sectional view of the fourth embodiment of the present invention illustrating a different drain feature.
Figure 42:
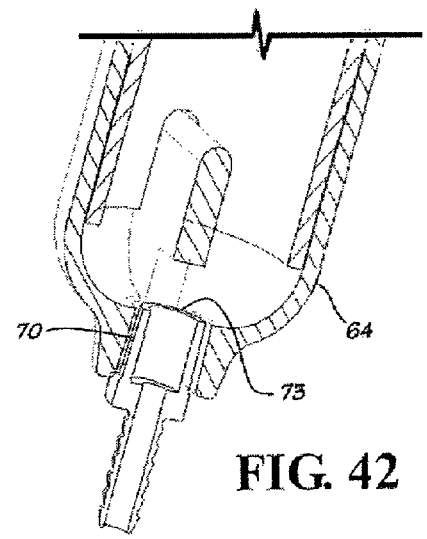
FIG. 42 is a sectional view of the fourth embodiment of the present invention illustrating a different drain feature.

FIGS. 39, 40 and 42 are cross sections of the fifth embodiment of the present invention. This illustrates the specific construction of how the water and other fluids are collected from the rod holder and directed to the drain hole 73 so they can be removed from the present invention. The drain hole 73 may include a fitting 70 therein which is constructed and arranged for attachment to a tube to facilitate removal of water and other fluids which may collect in the rod holder.

Figure 41:
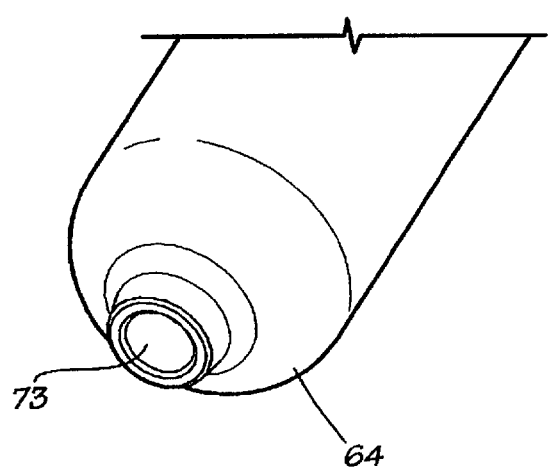
FIG. 41 is a bottom view of the fourth embodiment of the present invention illustrating a drain feature.

FIGS. 41 and 42 illustrate the drain hole 73 opening in the lower end of lower portion 64. The fitting 70 can be secured to this opening utilizing friction fit, threaded couplings, slip fit, etc. The slip fit and friction fit can optionally employ an adhesive to help secure the drain to the device.

FIGS. 43-45 illustrate a sixth embodiment of the present invention. In this embodiment various retainers 72, 74 and 76 are employed to retain a fishing rod within the rod holder.

Figure 46:
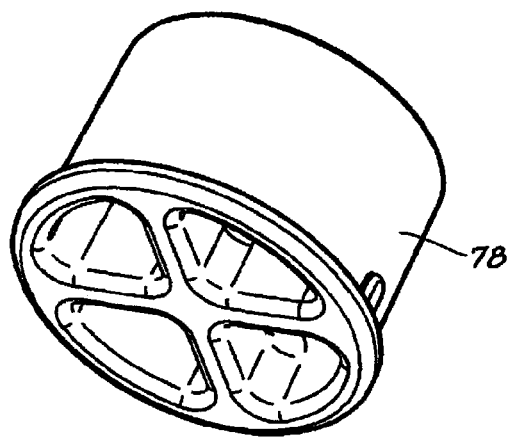
FIG. 46 is a bottom perspective view of a first type of fishing rod holder insert.
Figure 47:
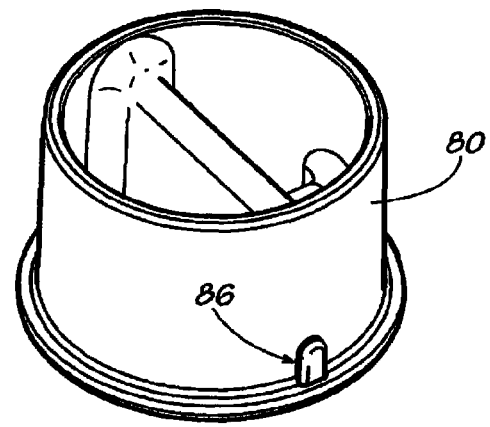
FIG. 47 is a side view of a second type of fishing rod holder insert.
Figure 48:
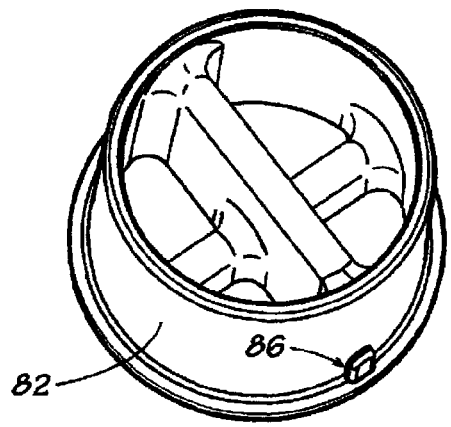
FIG. 48 is a top perspective view of a third type of fishing rod holder insert.
Figure 49:
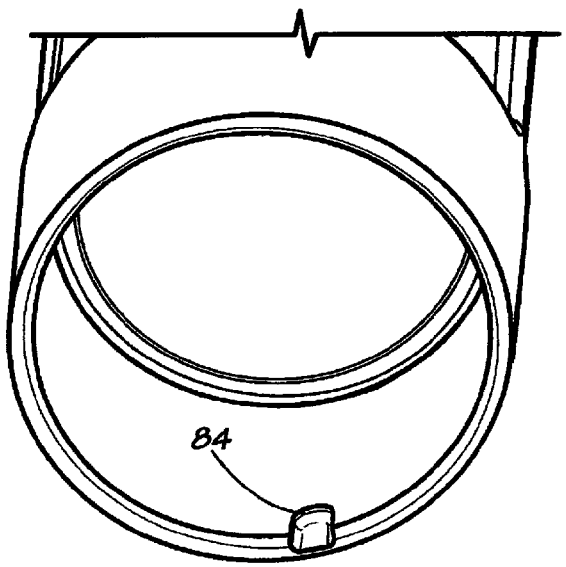
FIG. 49 is a detailed view of the lower portion of the fishing rod holder with a place for an alignment tab on a rod holder insert.

FIGS. 46-48 illustrate various retainers 78, 80, and 82 for holding a fishing rod in a seventh embodiment of the present invention. FIG. 49 illustrates a seventh embodiment of the present invention. On the lower end of this embodiment, there is at least one keyed receptacle or notch 84. On retainers 78, 80 and 82 there are at least one keyed projection 86.

Figure 50:
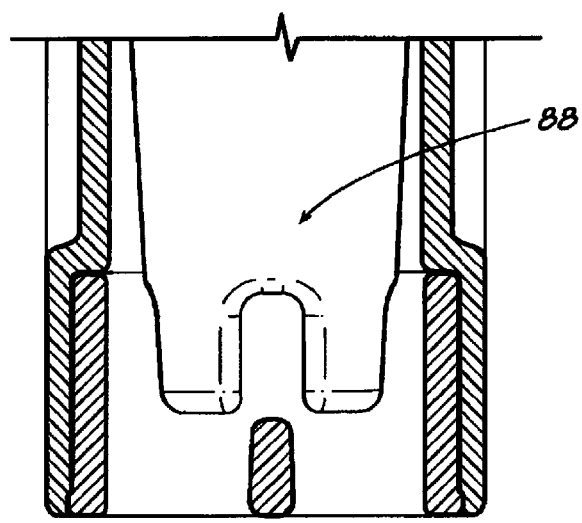
FIG. 50 illustrates a fishing rod adjacent a fishing rod holder of the present invention.
Figure 51:
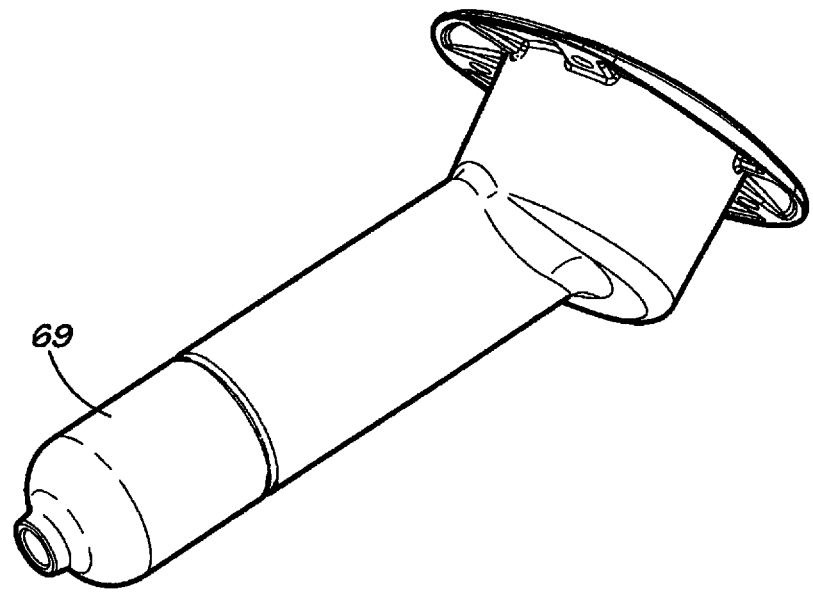
FIG. 51 illustrates a variation of the fourth embodiment of the present invention including a separable drain portion.

FIG. 50 illustrates how a fishing rod 88 engages the retainer secured to a lower end of the fishing rod holder. FIG. 51 illustrates a fishing rod positioned within the rod holder, which is shown in phantom.

Figure 52:
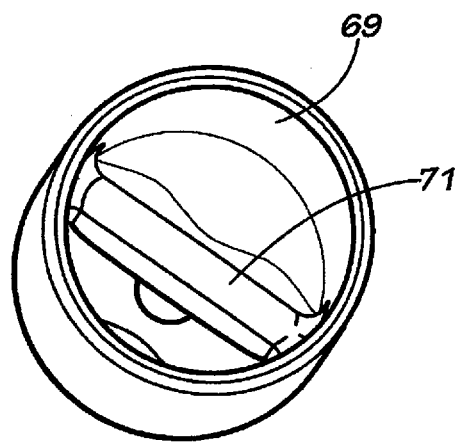
FIG. 52 illustrates the separable drain portion in FIG. 51.
Figure 53:
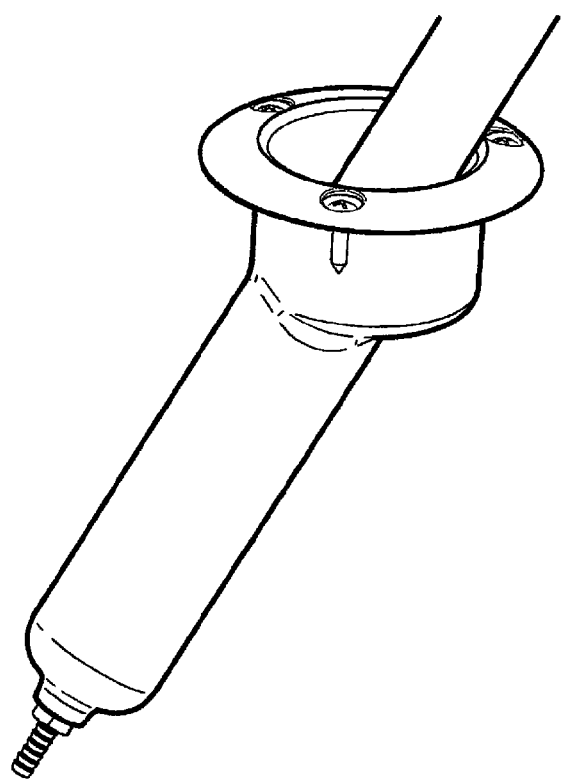
FIG. 53 illustrates a fishing rod in combination with the present invention.

FIG. 51 illustrates a variation of the fourth embodiment of the present invention wherein a separable drain portion 69 is secured to a lower end of the fishing rod and beverage holder. The drain portion 69 is preferably welded to the lower end of the device. It can also be secured utilizing various other methods. A fishing rod holder 71 can be incorporated into the drain portion 69, as shown in FIG. 52.

Figure 54:
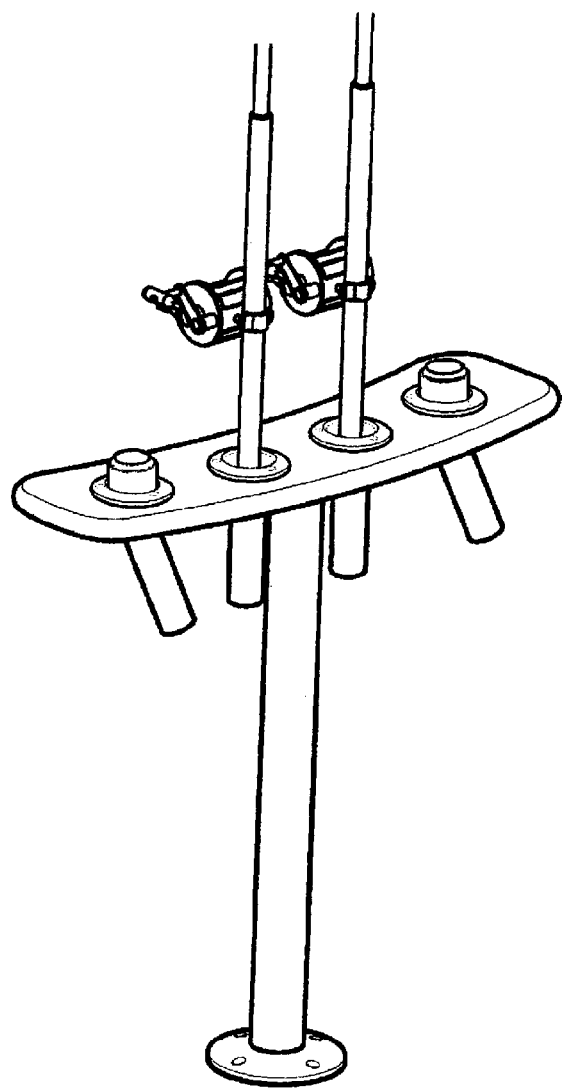
FIG. 54 illustrates a plurality of the present invention devices used on a fishing stand.

FIG. 54 illustrates the manner in which a plurality of the devices of the present invention can be employed on a fishing stand normally employed on a boat. FIG. 55 illustrates the manner in which the present invention can be employed on a boat. It can be utilized in conjunction with a fishing stand and/or secured to the hull of the boat.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A combined fishing rod and beverage holder comprising:
a first tubular portion having an outer surface, an inner bore, a top portion, a bottom portion and a length, said outer surface sized to fit within a substantially circular bore in a marine vessel, said inner bore sized to accept a beverage container, said inner bore having a longitudinal axis, said top portion of said first tubular portion having an outwardly extending flange thereon, said flange oriented substantially perpendicular with respect to said longitudinal axis for positioning said first tubular portion within said circular bore, said outwardly extending flange having at least one aperture extending therethrough, said at least one aperture sized to accept a fastener for securing said flange to a surface surrounding said substantially circular bore, said bottom portion of said first tubular portion having an inwardly extending flange with an aperture therethrough, said inwardly extending flange secured to an upper portion of a second tubular portion,
said second tubular portion having a second outer surface, a second inner bore, a second top portion and a second bottom portion and a length, said second outer surface smaller in diameter than said first outer surface, said second inner bore having a second longitudinal axis, said length of said second tubular portion is at least twice a diameter of said second inner bore, said length of said second tubular portion is at least twice the length of said first tubular portion, said length of said second tubular portion and said second inner bore sized to cooperate with a hand grip portion of a fishing rod so that said hand grip portion remains substantially axially aligned with said second longitudinal axis.

2. The combined fishing rod and beverage holder of claim 1 wherein said second bottom portion of said second tubular portion includes a bar member constructed and arranged to prevent rotation of said fishing rod hand grip portion.

3. The combined fishing rod and beverage holder of claim 2 wherein said bar member includes two members secured together to form a cross, said two members constructed and arranged to engage a corresponding fitting on an end of said hand grip portion of a fishing rod.

4. The combined fishing rod and beverage holder of claim 2 wherein said bar member is readily separable from said second bottom portion of said second tubular portion.

5. The combined fishing rod and beverage holder of claim 1 including a flexible ring secured to said inner bore of said first tubular portion of said combined fishing rod and beverage holder, said flexible ring constructed and arranged to receive and retain a beverage container within said first tubular portion of said combined fishing rod and beverage holder.

6. The combined fishing rod and beverage holder of claim 5 wherein said flexible ring is a rubber grommet.

7. The combined fishing rod and beverage holder of claim 5 wherein said flexible ring is a plurality of separable members spaced in relation to each other to hold and retain a beverage contained within said first tubular portion of said combined fishing rod and beverage holder.

8. The combined fishing rod and beverage holder of claim 1 wherein said second tubular portion of said combined fishing rod and beverage holder is readily removable from said first tubular portion of said combined fishing rod and beverage holder without the use of tools.

9. The combined fishing rod and beverage holder of claim 1 wherein said second longitudinal axis of said second inner bore of said second tubular portion of said combined fishing rod and beverage holder is oriented at an angle with respect to said first longitudinal axis of said inner bore of said first tubular portion, whereby said second longitudinal axis intersects said first longitudinal axis within said inner bore of said first tubular portion.

10. The combined fishing rod and beverage holder of claim 9 wherein said second longitudinal axis is oriented to cross said first longitudinal axis and extend through a top portion of said inner bore of said first tubular portion.

11. The combined fishing rod and beverage holder of claim 1 wherein said bottom portion of said second tubular portion of said combined fishing rod and beverage holder is substantially fluid tight and includes a drain hole for the removal of fluids.

12. The combined fishing rod and beverage holder of claim 11 wherein said drain hole includes a fitting therein, said fitting constructed and arranged for attachment to a tube member.

13. The combined fishing rod and beverage holder of claim 1 wherein said length of said second tubular portion is at least three times the diameter of said second inner bore.

14. The combined fishing rod and beverage holder of claim 1 wherein said length of said second tubular portion is at least four times the diameter of said second inner bore.

* * * * *